US011898924B2

(12) United States Patent
Sarwar et al.

(10) Patent No.: US 11,898,924 B2
(45) Date of Patent: Feb. 13, 2024

(54) DEFORMABLE SENSOR FOR SIMULATING SKIN AND OTHER APPLICATIONS

(71) Applicant: The University of British Columbia, Vancouver (CA)

(72) Inventors: Mirza Saquib Sarwar, Vancouver (CA); John D. W. Madden, Vancouver (CA); Garth Eden Claire Preston, Delta (CA)

(73) Assignee: The University of British Columbia, Vancouver (CA)

( * ) Notice: Subject to any disclaimer, the term of this patent is extended or adjusted under 35 U.S.C. 154(b) by 277 days.

(21) Appl. No.: 17/315,213

(22) Filed: May 7, 2021

(65) Prior Publication Data

US 2021/0333164 A1    Oct. 28, 2021

Related U.S. Application Data

(63) Continuation of application No. PCT/CA2019/051623, filed on Nov. 14, 2019.

(60) Provisional application No. 62/768,840, filed on Nov. 16, 2018.

(51) Int. Cl.
*G01L 5/165* (2020.01)
*G01L 1/14* (2006.01)
*G01V 3/08* (2006.01)

(52) U.S. Cl.
CPC .............. *G01L 5/165* (2013.01); *G01L 1/146* (2013.01); *G01V 3/088* (2013.01)

(58) Field of Classification Search
CPC ......... G01L 1/148; G01L 5/165; G01L 1/146; G01V 3/08; G01V 3/088
See application file for complete search history.

(56) References Cited

U.S. PATENT DOCUMENTS

| 5,642,015 | A   | * | 6/1997  | Whitehead ............. | H02N 1/006  |
|           |     |   |         |                        | 310/309     |
| 6,384,979 | B1  | * | 5/2002  | Whitehead ............ | G02F 1/1677 |
|           |     |   |         |                        | 359/263     |
| 8,250,926 | B2  | * | 8/2012  | Yang ....................... | G01L 1/142  |
|           |     |   |         |                        | 73/715      |
| 8,272,276 | B2  |   | 9/2012  | Gorjanc et al.         |             |
| 8,749,120 | B2  | * | 6/2014  | Liu ....................... | H10N 30/302 |
|           |     |   |         |                        | 29/25.35    |
| 8,893,561 | B2  |   | 11/2014 | Gorjanc et al.         |             |
| 9,112,058 | B2  | * | 8/2015  | Bao ........................ | G06F 3/0445 |
| 9,700,258 | B2  |   | 7/2017  | Jiang                  |             |
| 2014/0331787 | A1 |  | 11/2014 | Brookhuis et al.      |             |
| 2016/0363489 | A1 |  | 12/2016 | Li et al.              |             |

(Continued)

FOREIGN PATENT DOCUMENTS

CN          113607307 B   *  3/2023
WO     WO-2013132736 A1  *  9/2013  ............. G01L 1/146

*Primary Examiner* — Octavia Davis Hollington
(74) *Attorney, Agent, or Firm* — Todd A. Rattray; Oyen Wiggs Green & Mutalla LLP

(57) ABSTRACT

A sensor unit to be incorporated in a skin-like layer of machines such as robots employs a set of sensor electrodes supported in a first deformable sheet and a base electrode supported in a second deformable sheet, each of the sensor electrodes partially overlapping the base electrode so that application of a shear force causes the overlap of the electrodes to differentially change modifying the capacitance of the electrodes and permitting the detection of the shear force.

19 Claims, 16 Drawing Sheets

(56) References Cited

U.S. PATENT DOCUMENTS

2018/0356299 A1   12/2018   Watazu et al.
2022/0228938 A1*  7/2022   Ishizaki ................ G01L 13/026

* cited by examiner

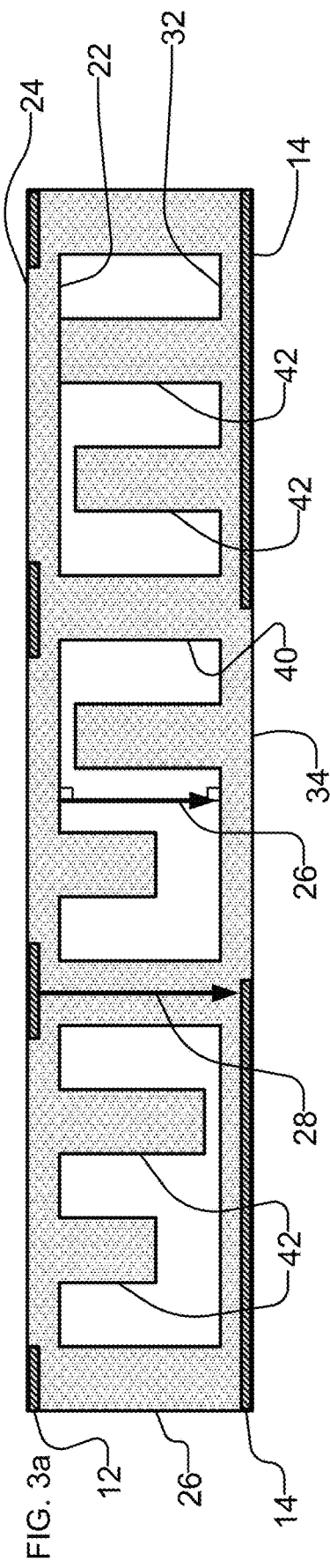
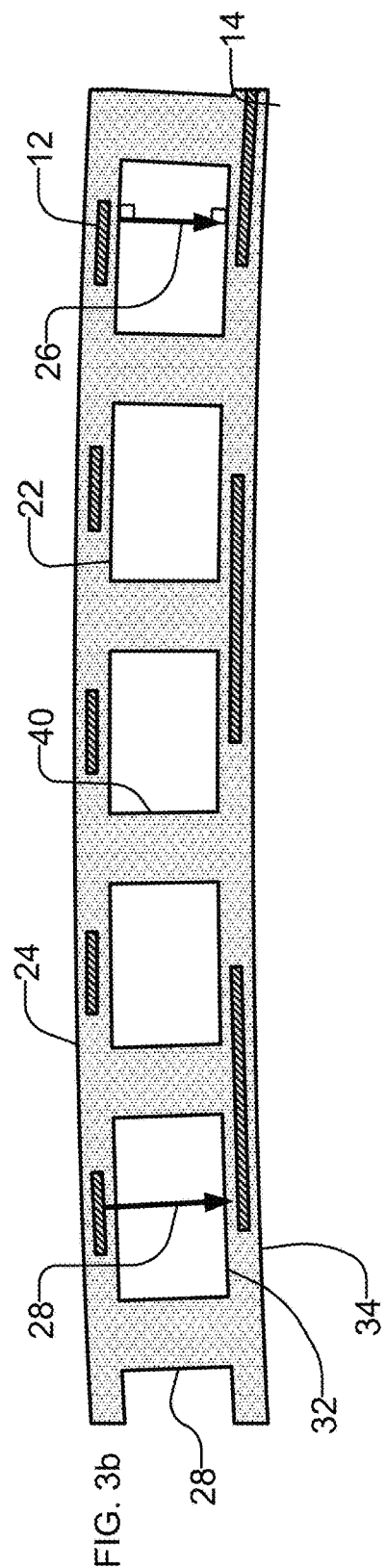

DEFORMABLE SENSOR FOR SIMULATING SKIN AND OTHER APPLICATIONS

RELATED APPLICATIONS

This application is a continuation of PCT application No. PCT/CA0219/051623 having an international filing date of 14 Nov. 2019, which in turn claims priority from, and the benefit under 35 USC 119 in relation to, U.S. application No. 62/768,840 filed on 16 Nov. 2018. All of the applications referred to in this paragraph are hereby incorporated herein by reference.

TECHNICAL FIELD

Deformable (e.g. elastically deformable) sensors are provided for detecting shear forces and, in some embodiments, optionally detecting proximity and/or pressure and discriminating shear forces from proximity and/or pressure. In particular embodiments, such deformable sensors can be used for simulating skin and/or a variety of other applications.

BACKGROUND

An aspect of research in the field of humanoid robotics is that the robots, which are designed to operate in social spaces, have capabilities that are "human-like". To accommodate for a complex interaction between humans and robots, it is desirable to provide the robot with a capability for touch identification that can be active over most of the robot's surface area (e.g. an "artificial skin"). Similar capabilities are also sought after by researchers in the field of neurally controlled prosthetic devices. The addition of tactile sensing can benefit the utility of neuroprosthetics by enhancing motor control. The functional requirements of an artificial skin are considered to include a skin-like surface, stretchability and the ability to sense tactile stimuli, such as light touch, pressure and/or shear. There exists work in the prior art literature on flexible touch and pressure sensors. These touch and pressure sensors can be capacitive, resistive and piezoelectric. In some such sensors, the flexibility aspect is incorporated using active materials such as AgNW, CNT, liquid metal, hydrogel etc. However in addition to sensing pressure oriented in the normal direction to the skin surface, shear sensing is desirable for an artificial skin when interacting with most objects especially fragile ones (e.g. an egg). The shear sensing capability may, for example, be used to ascertain just the right amount of pressure to apply, such that it is not too low that the object will slip and also not too large that the object will be damaged.

Some prior art research in this space includes:
Pang et al., "A flexible and highly sensitive strain-gauge sensor using reversible interlocking of nanofibres", Nat. Mater. 11, 795-801 (2012).
Park et al., "Stretchable Energy-Harvesting Tactile Electronic Skin Capable of Differentiating Multiple Mechanical Stimuli Modes", Adv. Mater. 26, 7324-7332 (2014).

The shear stimulus is a complex interaction to map. Commercially available shear sensors are individual sensors that detect the translational motion on the entire surface of the sensor. For artificial skin applications it is useful to be able to detect a local shear over a large surface. In literature the most widely implemented solution to attain localization is to fabricate a protrusion on the surface. An organic analogue for these protrusions can be skin warts. When a shear force (i.e. force that is oriented in a direction generally tangential to the main skin/sensor surface (e.g. at locations away from the protrusion)) is applied to such a protrusion, the shear/tangential force is translated into a primarily normally oriented force (i.e. a force oriented in a direction generally normal to the main skin/sensor surface (e.g. at locations away from the protrusion)) due to a resultant torque applied at the base of the protrusion. In such implementations, it is not the true surface/tangential shear that is being measured, but instead what is being measured is a derived element (i.e. the normal force associated with torque on the protrusions). Additionally, for a skin implementation a smooth surface is preferred over such protrusions.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a soft and stretchable sensor that is capable of mimicking skin. The sensor may sense a light touch, pressure and shear and may provide a clear distinction (e.g. the ability to discriminate) between these different stimuli and provide directional information regarding the shear. The surface of the sensor can be smooth (e.g. free from protrusions) and similar to human skin in that it may buckle and stretch with shear. In some embodiments, the sensor may be able to differentiate between interaction with different materials, such as human skin and inanimate objects including plastic, wood, etc., an ability that is desirable, for example, for robots interacting with humans. Additionally, the structure of the dielectric of the sensor in some embodiments, is such that upon lightly caressing the sensor it feels flat and smooth, but when pressure is applied to the sensor surface (e.g. when the sensor is used in an element of skin that grips an object), the surface friction co-efficient may increase due to the protrusion of pillars from within the dielectric. Such an increase in surface friction co-efficient may aid the grip. In some embodiments, the sensor uses a combination of mutual capacitance to detect the proximity and a light touch of a human and overlap capacitance to detect pressure and shear. In some embodiments, the architecture of the dielectric gives the sensor the skin like abilities to buckle and stretch at the location of a shear.

One aspect of the invention provides a sensor unit for detecting shear force applied to the sensor in a tangential direction that is generally tangential to an active surface of the sensor at a location where the shear force is applied. The sensor unit comprises: a first deformable sheet comprising the active surface on one side of the first deformable sheet and a first inner surface on an opposing side of the first deformable sheet; and a second deformable sheet comprising a second inner surface on one side of the second deformable sheet. The first inner surface has a first inner surface normal vector oriented toward the second inner surface and is spaced apart from the second inner surface in a direction along the first inner surface normal vector. One of the first and second deformable sheets supports one or more electrically conductive sensor electrodes and the other one of the first and second deformable sheets supports an electrically conductive base electrode. The sensor unit also comprises a plurality of bonded dielectric pillars, each bonded dielectric pillar extending between the first inner surface and the second inner surface and bonded to the first inner surface at a first one of its ends and to the second inner surface at an opposing second one of its ends. The plurality of bonded dielectric pillars are spaced apart from one another in one or more directions tangential to the first inner surface.

Another aspect of the invention provides a sensor unit for detecting shear force applied to the sensor in a tangential direction that is generally tangential to an active surface of the sensor at a location where the shear force is applied. The sensor unit comprises: a first deformable sheet comprising the active surface on one side of the first deformable sheet and a first inner surface on an opposing side of the first deformable sheet; and a second deformable sheet comprising a second inner surface on one side of the second deformable sheet and an outer surface on an opposing side of the second deformable sheet. The first inner surface has a first inner surface normal vector oriented toward the second inner surface and is spaced apart from the second inner surface in a direction along the first inner surface normal vector. One of the first and second deformable sheets supports one or more electrically conductive sensor electrodes and the other one of the first and second deformable sheets supports an electrically conductive base electrode. The sensor unit also comprises a deformable dielectric layer located in at least some of a volume between the first inner surface and the second inner surface. In response to shear force oriented in a direction tangential to the active surface, the first sheet moves in the tangential direction relative to the second sheet and at least one of the one or more sensor electrodes moves in the tangential direction relative to the base electrode. For such movement of the at least one of the one or more sensor electrodes, a first capacitance between the at least one of the one or more sensor electrodes and the base electrode either: increases relative to its capacitance in an absence of the shear force; or decreases relative to its capacitance in the absence of the shear force.

Another aspect of the invention provides a method for detecting shear force applied to a sensor in a direction that is generally tangential to an active surface of the sensor at a location where the shear force is applied. The method comprises: providing a shear sensor comprising: a first sheet comprising the active surface on one side of the first sheet and a first inner surface on an opposing side of the first sheet; and a second sheet comprising a second inner surface on one side of the second sheet. The first inner surface has a first inner surface normal vector oriented toward the second inner surface and is spaced apart from the second inner surface in a direction along the first inner surface normal vector. One of the first and second sheets supports one or more electrically conductive sensor electrodes and the other one of the first and second sheets supports an electrically conductive base electrode. The shear sensor also comprises a deformable dielectric layer located in at least some of a volume between the first inner surface and the second inner surface. The method comprises, in response to shear force oriented in a direction tangential to the active surface, permitting movement of the first sheet in the tangential direction relative to the second sheet and corresponding movement of at least one of the one or more sensor electrodes in the tangential direction relative to the base electrode; and, in response to the relative movement in the tangential direction between the at least one of the one or more sensor electrodes and the base electrode, detecting at least one of: an increase and a decrease in a first capacitance between the at least one of the one or more sensor electrodes and the base electrode relative to its capacitance in an absence of the shear force.

Another aspect of the invention provides a sensor unit for detecting shear force applied to the sensor in a tangential direction that is generally tangential to an active surface of the sensor at a location where the shear force is applied. The sensor unit comprises: a first deformable sheet comprising the active surface on one side of the first deformable sheet and a first inner surface on an opposing side of the first deformable sheet; and a second deformable sheet comprising a second inner surface on one side of the second deformable sheet and an outer surface on an opposing side of the second deformable sheet. The first inner surface has a first inner surface normal vector oriented toward the second inner surface and is spaced apart from the second inner surface in a direction along the first inner surface normal vector. One of the first and second deformable sheets supports a plurality of electrically conductive electrodes and the other one of the first and second deformable sheets supports a base electrically conductive electrode. The sensor unit also comprises: a contiguous bonded dielectric pillar that extends between the first inner surface and the second inner surface and is bonded to the first inner surface at a first one of its ends and to the second inner surface at an opposing second one of its ends wherein the contiguous bonded dielectric pillar forms a contiguous boundary of the active surface one or more directions tangential to the first inner surface; and one or more support dielectric pillars located within the boundary, each support dielectric pillar bonded to one of the first inner surface and the second inner surface at a bonded one of its ends and having a non-bonded end that is capable of translation relative to the other one of the first inner surface and the second inner surface. The one or more support dielectric pillars are spaced apart from each of the plurality of bonded dielectric pillars in one or more directions tangential to the first inner surface.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 3a depicts a side view cross-section of a capacitive sensing unit according to a particular embodiment with generally planar deformable dielectric sheets.

FIG. 3b depicts a side view cross-section of a capacitive sensing unit according to a particular embodiment with lightly curved deformable dielectric sheets.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 2A:
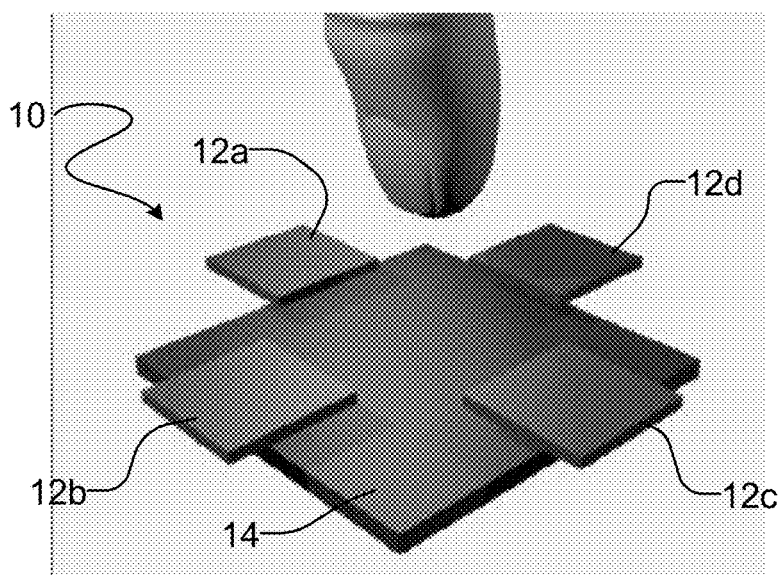
FIG. 2a depicts a schematic perspective view of a finger in proximity to the electrodes of a capacitive sensing unit according to a particular embodiment.
Figure 4A:
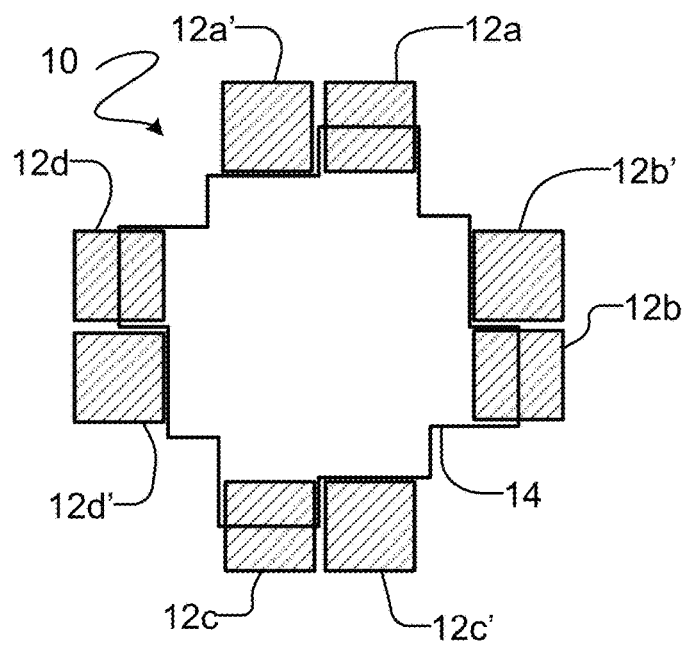
FIGS. 4a-4d depict various schematic plan views of sensing electrodes and base electrodes of both single capacitive sensing units and arrays of capacitive sensing units according to particular embodiments.
Figure 4B:
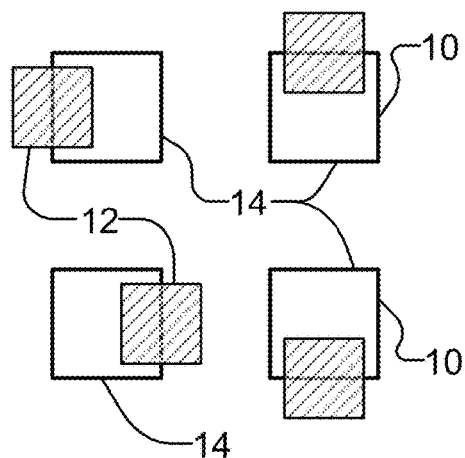

A capacitive sensing unit 10 is provided by an arrangement of a plurality of electrodes, in which one or more sensor electrodes 12 are positioned at a distance from one or more base (e.g. ground) electrodes 14. In a preferred embodiment four sensor electrodes 12a, 12b, 12c, and 12d (collectively, sensor electrodes 12), and one base (ground) electrode 14 are arranged as shown in FIG. 2a. In other embodiments, there may be 3, 5, or more sensor electrodes 12 and in some embodiments there may be two or more base electrodes 14 for each set of sensor electrodes 12 in a single capacitive sensing unit 10. A plurality of capacitive sensing units 10 can be combined in a pattern or array that can extend or repeat over a given surface (e.g. the surface of an artificial skin). Generally, the embodiments described herein comprise a plurality of sensor electrodes 12; however, in some embodiments, each sensor unit 10 may comprise a single sensor electrode 12, as shown in FIG. 4b.

Figure 3C:
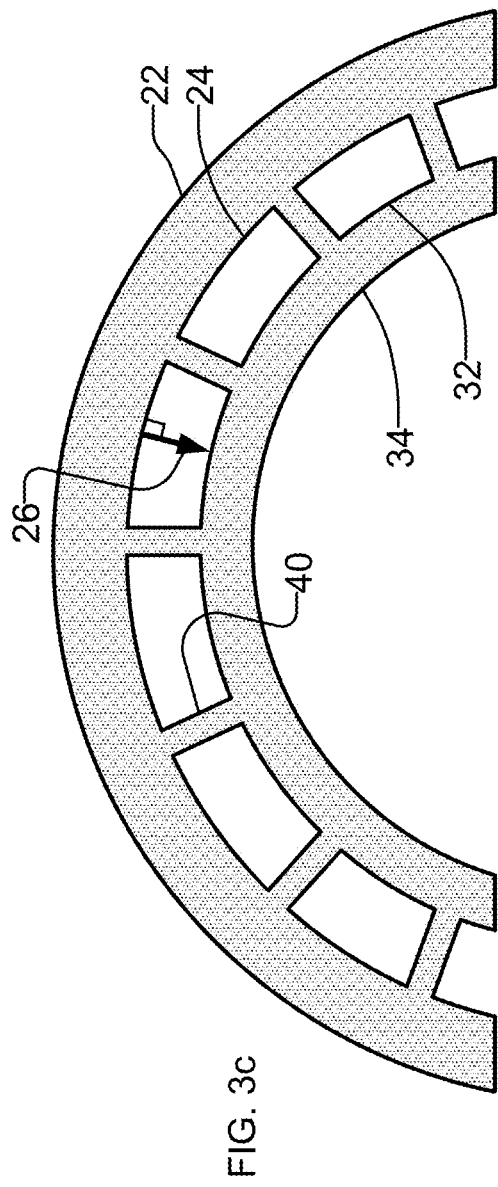
FIG. 3c depicts a side view cross-section of a capacitive sensing unit according to a particular embodiment with greater curvature than in the embodiments shown in FIGS. 3a and 3b.

The plurality of sensor electrodes 12 and base electrode 14 are supported by two or more layers of deformable (e.g. elastically deformable) sheets. In FIGS. 3a through 3c the sensor electrodes 12 are supported by an upper elastically deformable sheet 20 while the base electrode 14 is supported by a lower elastically deformable sheet 30. The two deformable sheets 20 and 30 are layered over each other and are separated by bonded pillars 40. The deformable sheets 20, 30 and the bonded pillars 40 may provide a dielectric for capacitive sensing. In the illustrated embodiments, upper deformable sheet 20 comprises an inner surface 22 (that faces lower sheet 30) and an active surface 24 (that is exposed to the sensing environment). In the illustrated embodiments, lower deformable sheet 30 comprises an inner surface 32 (that faces upper sheet 20) and an outer surface 34. In the FIG. 3a embodiment, the deformable sheets 20, 30 are shown as being flat, parallel sheets (i.e. such that surfaces 22, 24, 32, 34 are generally planar), but, in some embodiments, the sheets 20, 30 may have curvature, as shown in FIGS. 3b and 3c. Generally, deformable sheets 20, 39 may be locally parallel to each other, such that a normal vector directed out of the inner surface 22 of upper sheet 20 will be at least approximately normal (e.g. +10° in some embodiments and +/20° in some embodiments) to the inner surface 32 of lower sheet 30, and a normal vector 26 directed out of inner surface 32 of lower sheet 30 will be at least approximately normal (e.g. +/10° in some embodiments and +/20° in some embodiments) to the inner surface 22 of upper sheet 20.

While, in the illustrated embodiments, the sensor electrodes 12 are shown as being supported by the upper deformable sheet 20 and the base electrode 14 is shown as being supported by the lower deformable sheet 30, the sensor electrodes 12 could alternatively be supported by the lower deformable sheet 30 and the base electrode 14 supported by the upper deformable sheet 20. In some embodiments there may be three or more layers of deformable sheets, with electrodes distributed across the various layers of deformable sheets.

Figure 3D:
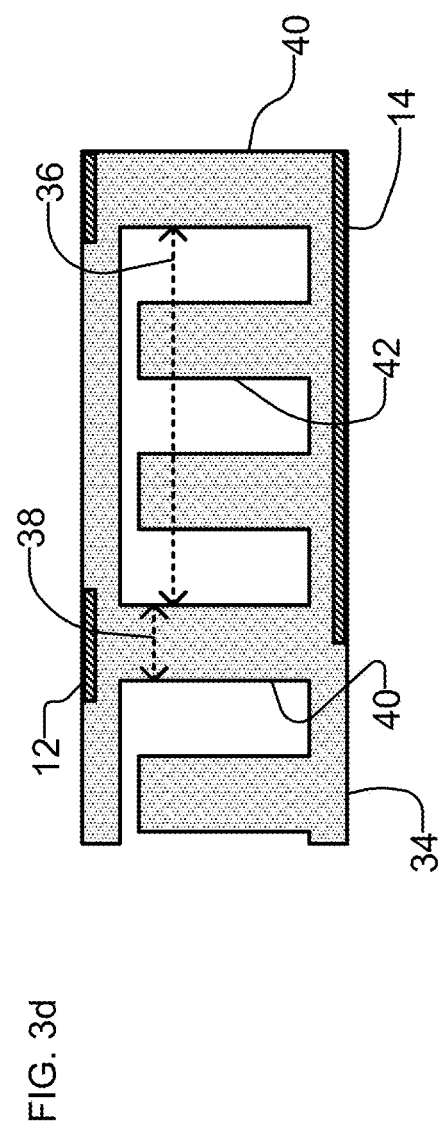
FIG. 3d depicts a magnified portion of the side view cross-section of a capacitive sensing unit according to a particular embodiment further illustrating the dielectric architecture.

In the illustrated embodiments of FIGS. 3a and 3b, each of the plurality of sensor electrodes 12 and base electrode 14 respectively supported in the deformable sheets 20, 30 are shown as being embedded in the deformable sheets 20, 30. For example, sensor electrodes 12 are embedded in upper sheet 20 between active surface 24 and inner surface 22 and base electrode 14 is embedded between inner surface 32 and the outer surface 34. However, such embedding of electrodes 12, 14 in sheets 20, 30 is not necessary. Sensor electrodes 12 and base electrode 14 may be supported in the deformable sheets 20 and 30 at a variety of locations within or on one or more of the surfaces of the deformable sheets and by any of a variety of means, as will be described further below. For example, as shown in FIG. 3d, electrodes 12, 14 may be respectively supported by sheets 20, 30 so that electrodes 12 provide part of the active surface 24 and so that electrodes 14 provide part of outer surface 34. Sensor electrodes 12 and base electrode 14 are not shown in FIG. 3c.

Sensor electrodes 12 and base electrode 14 each comprise a capacitive surface. Such capacitive surfaces may include the inner surfaces of sensor electrodes 12 (i.e. the surfaces of sensor electrodes 12 that are most proximate to base electrode 14) and the inner surface of base electrode 14 (i.e. the surface of base electrode 14 most proximate to sensor electrodes 12). In many embodiments each sensor electrode 12 partially overlaps a portion of the base electrode 14 in a corresponding direction normal to inner surface of the sensor electrode and/or in a direction normal to the inner surface 22 of the upper sheet 20 when the deformable sheets 20, 30 are in a resting or relaxed position (e.g. in the absence of external forces). In this description and the accompanying claims, two or more elements (e.g. surfaces and/or objects) may be said to "overlap" one another in a "direction", when a line oriented in that direction may be drawn to intersect the two or more elements. The greater the surface area of the two or more elements for which this condition is satisfied, the greater the overlap in the direction. Accordingly, as shown, for example, in the embodiments of FIGS. 3a and 3b, in some embodiments, portions of sensor electrodes 12 overlap base electrode 14 in the direction of a normal vector 28. Normal vector 28 may be normal to the inner surface of a sensor electrode 12 and/or to the inner surface 22 of upper sheet 20. In some embodiments, normal vector 28 may additionally or alternatively be normal to the inner surface of base electrode 14 and/or to the inner surface 32 of lower sheet 30.

Figure 4C:
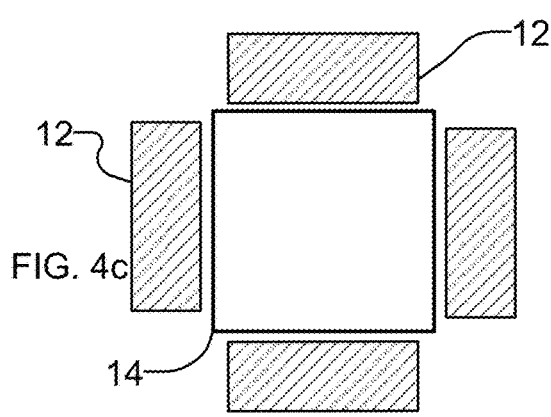
Figure 4D:
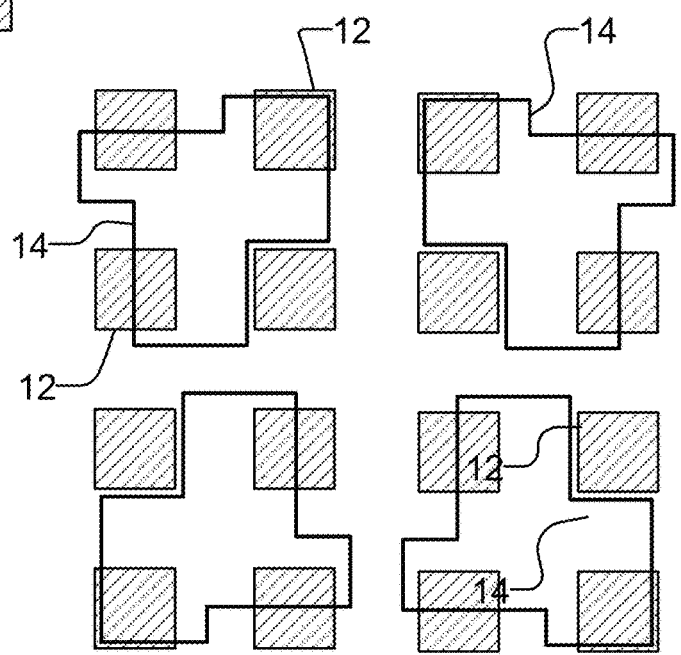

While in the illustrated embodiments, each of sensor electrodes 12 partially overlaps the base electrode 14 in the normal directions 28 in the absence of applied force (i.e. a fraction of the surface area between 0 and 1 (exclusive) satisfies the overlapping condition in the normal directions 28), in some embodiments, one or more sensor electrodes 12 may completely overlap the base electrode 14 in the normal directions 28 and one or more sensor electrodes 12 may be completely non-overlapping the base electrode 14 in the normal direction 28 when the deformable sheets 20, 30 are in their relaxed position (i.e. in the absence of applied force). In FIGS. 4a-4d, various embodiments are shown in a plan view, in which the sensor electrodes 12 are shaded with diagonal lines and the base electrode(s) 14 is/are shown as white. In FIG. 4a, four sensor electrodes 12a, 12b, 12c, and 12d are partially overlapping base electrode 14 in the normal directions 28 in the absence of applied force, while four sensor electrodes 12a', 12b' 12c' and 12d' are completely non-overlapping base electrode 14 in the normal directions 28 in the absence of applied force. In FIG. 4b, there is only one sensor electrode 12 per base electrode 14 and each sensor electrode 12 partially overlaps its corresponding base electrode 14 in the normal directions 28 in the absence of applied force. In FIG. 4c, all of sensor electrodes 12 are completely non-overlapping base electrode 14 in the normal directions 28 in the absence of applied force. FIGS. 4a and 4d show configurations in which sensor electrodes 12 may differentially overlap with one or more base electrodes 14. FIGS. 4b and 4d show examples of how multiple sensor units 10 may be repeated in a grid to produce an array of sensor units.

Figure 2B:
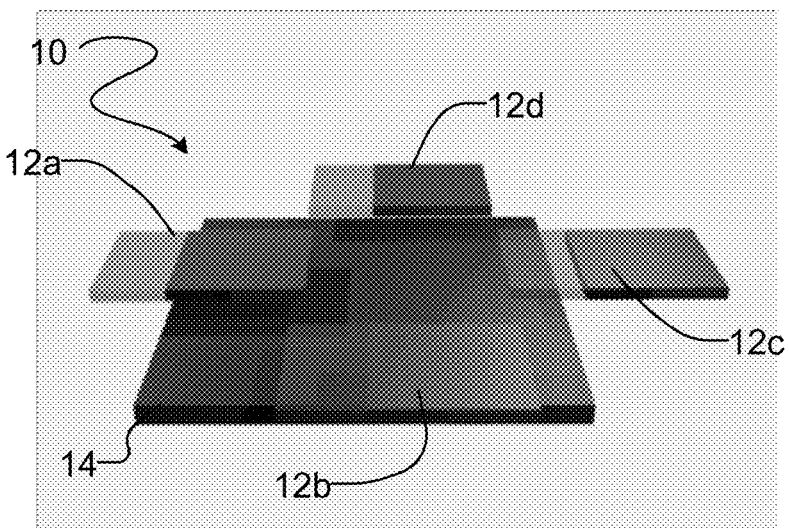
FIG. 2b depicts a perspective view of the motion of sensor electrodes of the FIG. 2A capacitive sensing unit under the influence of an applied shear force.
Figure 2C:
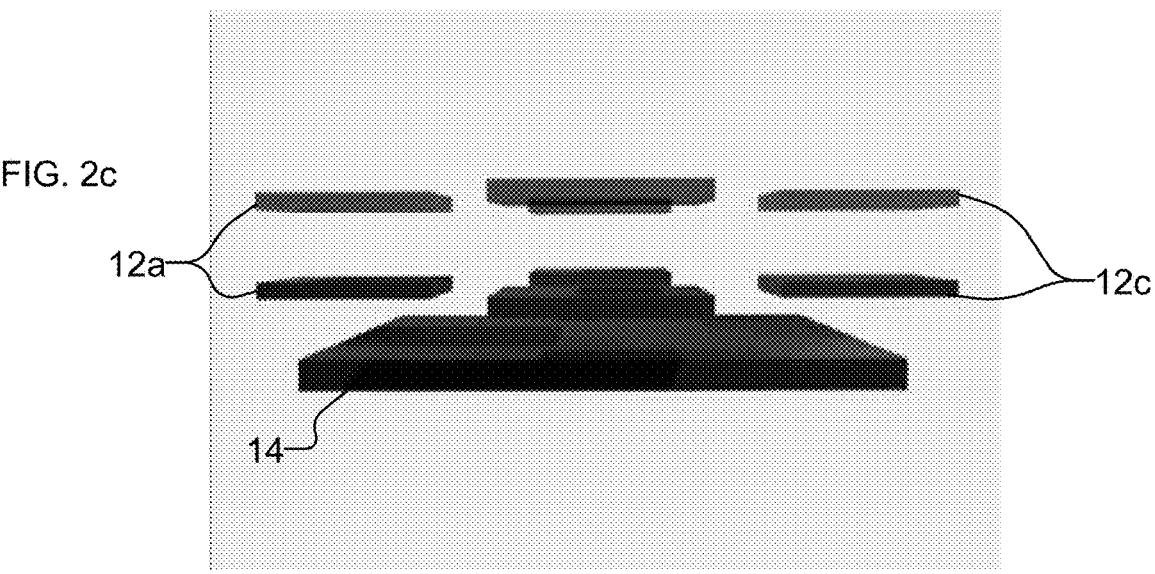
FIG. 2c depicts a perspective view of the motion of sensor electrodes of the FIG. 2A capacitive sensing unit under the influence of an applied pressure.

While the sensor electrodes 12 and base electrodes 14 as shown in the embodiments of FIGS. 2a-2c are depicted as having a square cross-section, a variety of cross sections could be used for either of the sensor electrodes 12 and base electrodes 14. In an example embodiment, as shown in FIG. 4a, there could be 8 sensor electrodes 12 and a polygonal base electrode 14. In a further embodiment, as shown in FIG. 4c, sensor electrodes 12 could have a rectangular or other polygonal cross section.

Similar to the deformable sheets 20 and 30, the sensor electrodes 12 and base electrodes 14 may also have curvature. In the illustrated embodiments, the electrodes 12, 14 are shown as being generally flat. Where the inner surface 22 of upper sheet 20 is flat, it can be used to define a set of Cartesian coordinates in which inner surface 22 of upper sheet 20 defines the X-Y plane, and the normal vector 28 extending from inner surface 22 of upper sheet toward inner surface 32 of lower sheet 30 defines the direction of increasing Z. For embodiments in which the deformable sheets have curvature this may be generalized into curvilinear coordinates by mapping the X-Y plane onto inner surface 22 of upper sheet 20 as a curvilinear X-Y surface, and letting normal vectors out of the inner surface 22 of upper sheet provide the directions of increasing Z.

Referring back to the embodiment shown in FIGS. 2a-2c, each of the sensor electrodes 12a, 12b, 12c and 12d (coupled with base electrode 14) has a capacitance $C_a$, $C_b$, $C_c$, and $C_d$ respectively. A human finger or other object in proximity or lightly touching the sensor electrodes 12 (as shown in FIG. 2a) decouples the projected electric fields (from between sensor electrodes 12 and base electrode 14) and thereby reduces all of the capacitances $C_a$ through $C_d$. Upon application of a pressure, all four sensor electrodes 12 are displaced (in normal direction (e.g. the z-direction in the illustrated embodiment) closer to the base electrode thereby increasing all four capacitances $C_a$ through $C_d$ (as shown in FIG. 2c). Applying a shear force in the positive x-axis direction (tangential to the active surface 24) moves the sensor electrode 12a in the positive x-axis direction relative to base electrode 14, increasing the overlapping area of sensor electrode 12A with base electrode 14 in the normal (e.g. z-axis) direction, and in turn increasing $C_a$. Correspondingly, sensor electrode 12c moves in the positive x-axis direction relative to base electrode 14, decreasing overlapping area of sensor electrode 12c with base electrode 14 in the normal (e.g. z-axis) direction, and in turn decreasing $C_c$ (FIG. 2b). The shear has minimal effects on $C_b$ and $C_d$. This combination of changes in $C_a$ through $C_d$ is characteristic of a shear in the positive x-axis direction, providing information regarding both the magnitude of shear and the direction of shear.

To obtain a localized shear and to simulate the buckling and stretching similar to shearing skin, a deformable (e.g. elastically deformable) dielectric architecture may be employed between sheets 20, 30 as shown in FIGS. 3a-3d, 5, and 6. Upper deformable sheet 20 and lower deformable sheet 30 are layered on top of each other, but are spaced apart (e.g. in normal directions) with a gap between the sheets 20, 30. Sheets 20, 30 are separated by a plurality of deformable (e.g. elastically deformable) pillars. In the embodiments described herein, there may be two types of elastically deformable pillars—bonded pillars 40 and support pillars 42. As shown in the particular case of the embodiment shown in FIGS. 4 and 5, bonded pillars 40 have a square cross-section, while the support pillars 42 have either whole or broken X or cross-shaped cross-sections. In some embodiments, the sensor unit may have only bonded pillars 40, such as those shown in FIGS. 3b and 3c.

Bonded pillars 40 are attached, integrally formed with or otherwise bonded at each of their ends to the upper and lower deformable sheets 20, 30 respectively. Support pillars 42 are attached, integrally formed with or otherwise bonded only at a single end to one or the other of the upper and lower deformable sheets 20, 30. In the embodiments shown in FIGS. 5, 6, 8 and 9, all of the support pillars 42 are bonded to the lower deformable sheet 30; however, in other embodiments, the support pillars 42 may be bonded to the upper deformable sheet 20. In yet other embodiments, one or more first support pillars 42 may be bonded to the upper deformable sheet 20 and one or more second support pillars 42 may be bonded to the lower deformable sheet 30. In several of the embodiments shown herein, support pillars 42 have a dimension in the normal (e.g. Z-axis) direction, such that there is a gap between the end of the pillar 42 and the sheet 20, 30 to which they are not bonded. In some embodiments, the support pillars 42 could have a dimension in the normal (e.g. Z-axis) direction, such that the unbonded ends of the support pillar abut the sheet to which they are not bonded, such as is shown with the rightmost support pillar 42 in FIG. 3a.

In some embodiments, the sensor electrodes 12 may be arranged so that each sensor electrode 12 entirely or partially overlaps a bonded pillar 40 in the normal directions (e.g. the z-direction). In some such embodiments, 50% or more of the surface area of an inner surface of each sensor electrode 12 may overlap the bonded pillars 40 in the normal directions. In some embodiments, 90% or more of the surface areas of the inner surfaces of each sensor electrode 12 may overlap the bonded pillars 40.

Pillars 40, 42 may be bonded to sheets 20, 30 using any of a variety of suitable techniques. By way of non-limiting example, in some embodiments, pillars 40, 42 may be produced in the same mold as a deformable sheet 20, 30 as a unitary body. For example, support pillars 42 may be produced in the mold of the lower deformable sheet 30 and the bonded pillars 40 may be produced in the mold of the upper deformable sheet 20, and the lower end of the bonded pillars 40 may then be bonded to the lower deformable sheet 30, as described below.

The spacing and sizing of the bonded pillars 40 should be chosen, so that they can easily bend upon application of a shear force at the active surface 24 of upper sheet 20. Of course, the range of shear forces in any particular application may vary and, consequently, so may the spacing and sizing of bonded pillars 40. In some embodiments, the spacing and sizing of the bonded pillars is chosen to be deformable under a range of forces capable of being applied by a human finger. In some such embodiments, this range of forces is less than 80N. In some such embodiments, this range of forces is less than 50N. In some such embodiments, this range of forces is less than 25N. In the embodiments shown in FIGS. 5, 6, 8 and 9, bonded pillars 40 are bonded to both the upper and lower sheets 20, 30 but support pillars 42 are only bonded to lower sheet 30. Support pillars 42 can help retain a smooth active surface 24 of upper sheet 20 by preventing upper sheet 20 from collapsing at regions not supported by bonded pillars 40, while simultaneously enabling a tangentially oriented sliding motion of upper sheet 20 upon application of a shear forces. This feature may provide the sensor unit with the ability to buckle and stretch in a localized region, mimicking human skin as shown in FIGS. 1a-1d. Additionally upon pressing or gripping an arbitrary shaped object with the sensor as a skin, upper sheet 20 is compressed toward lower sheet 30, protrusions may be formed as between regions of upper sheet supported by pillars 40, 42 and the gaps (where parts of upper sheet 20 are not supported by any pillars). Such protrusions may enhance the co-efficient of friction to aid the grip of the object. In the embodiments described herein, the space between the deformable sheets and pillars is filled with air, but in some embodiments the gaps may be filled with other deformable dielectric materials, for example a light foam with suitable dielectric characteristics.

Figure 7A:
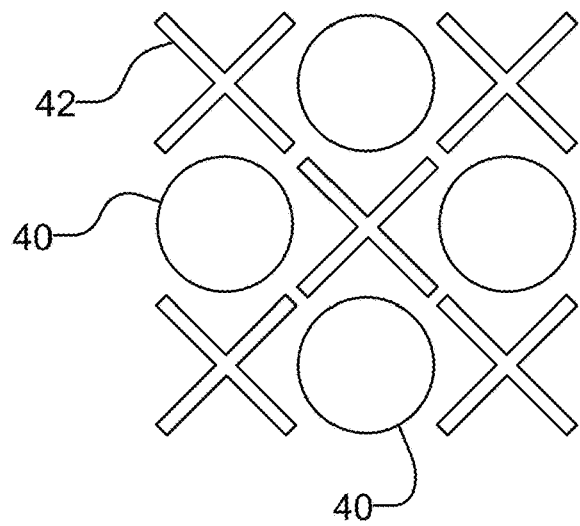
FIGS. 7a-7c depicts various schematic plan views of bonded pillar and support pillar cross-sections suitable for use with various embodiments of the invention.
Figure 7B:
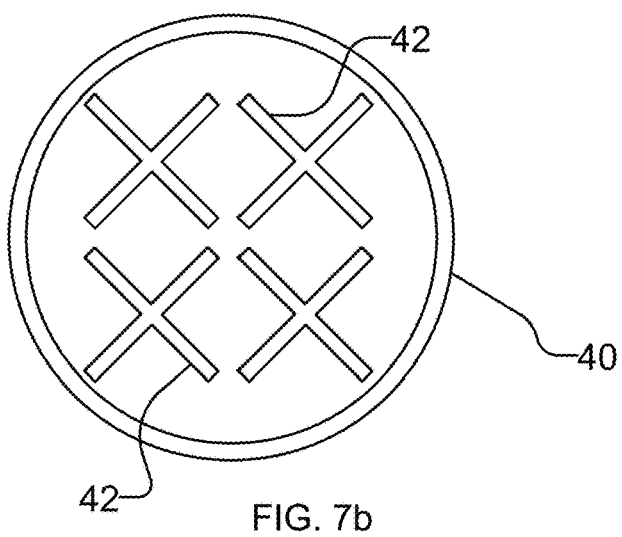
Figure 7C:
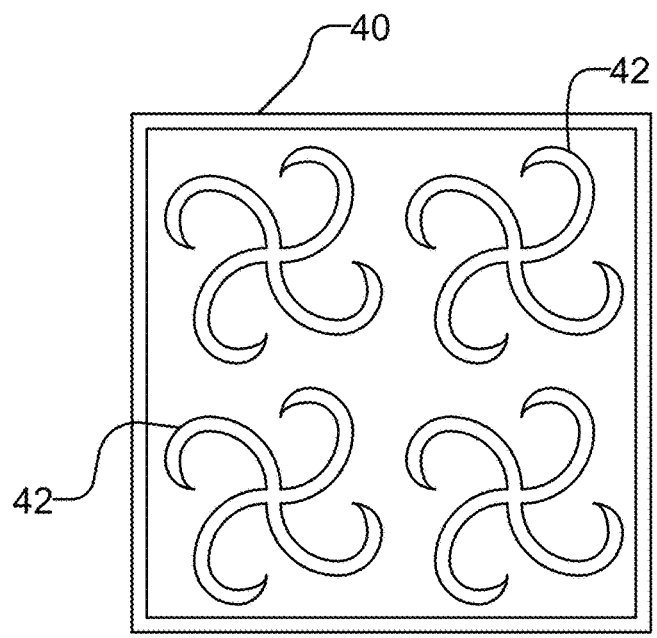
Figure 8:
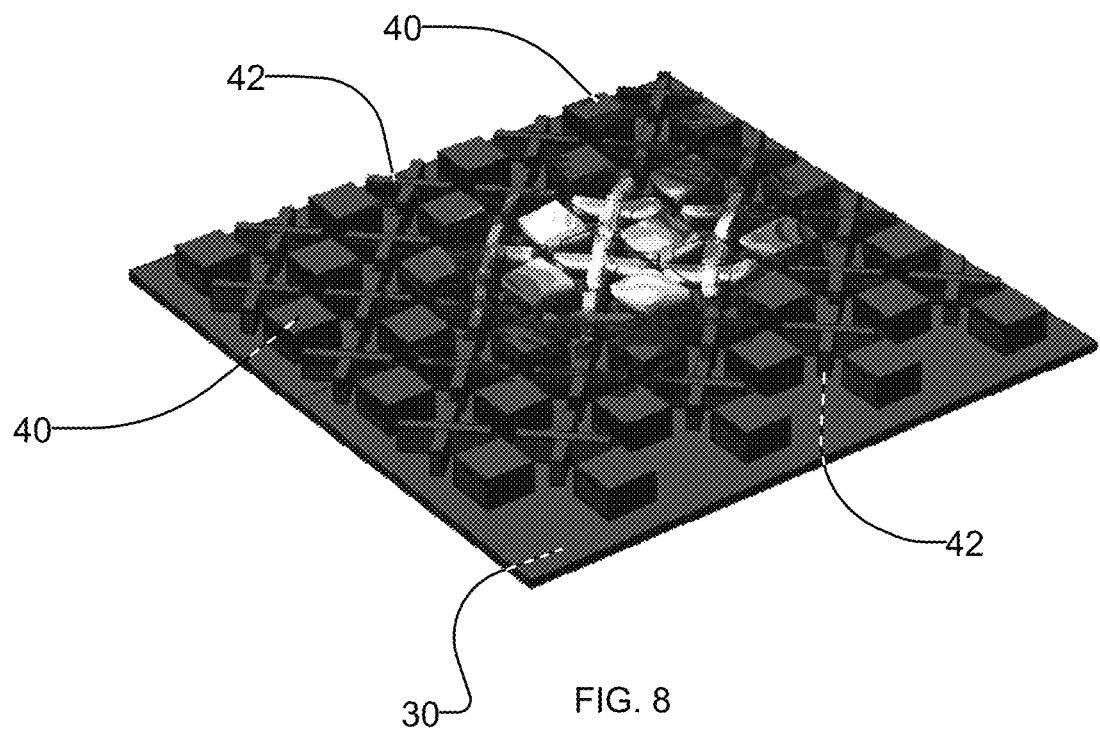
FIG. 8 depicts a map of forces observed by bonded and support pillars of an embodiment of the invention during the application of force by a finger as shown in FIG. 9.
Figure 9:
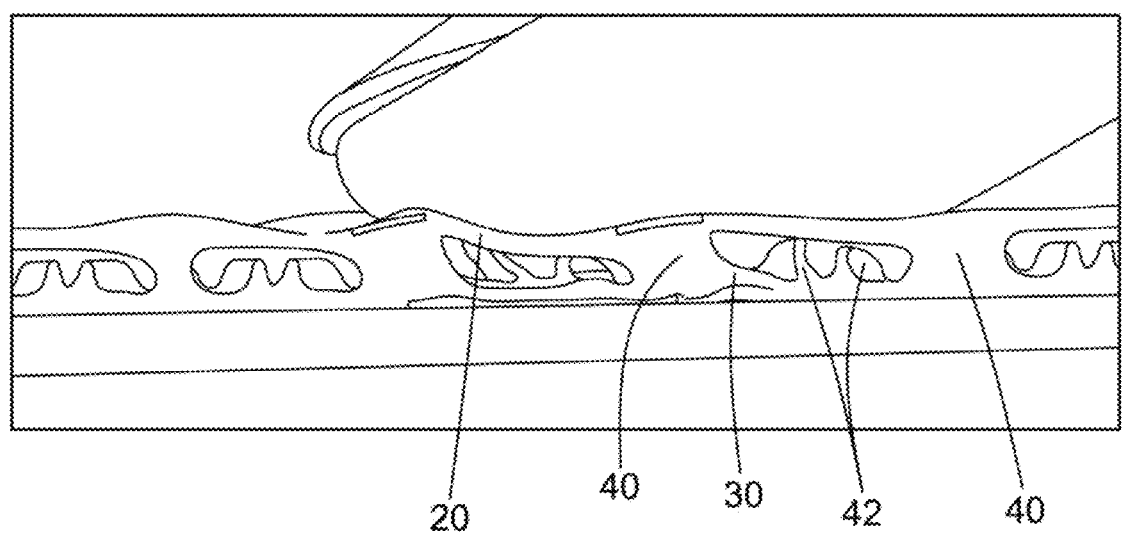
FIG. 9 is a photo of a finger applying force to a capacitive sensing unit according to an embodiment of the invention.
Figure 10A:
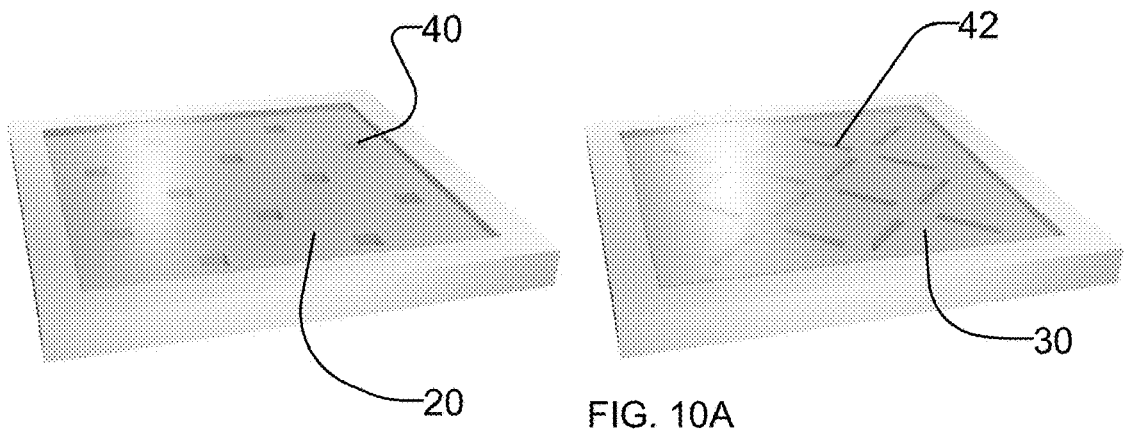
FIGS. 10A-10D depict perspective views of various steps of a method for fabrication of a capacitive sensing unit according to an embodiment of the invention.
Figure 10B:
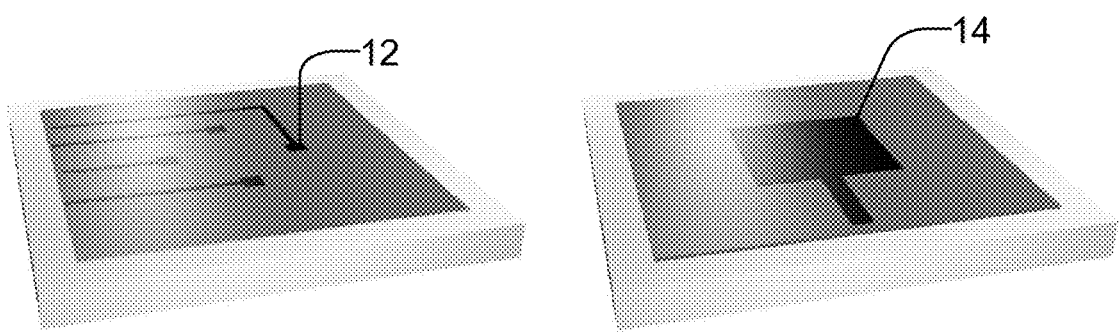
Figure 10C:
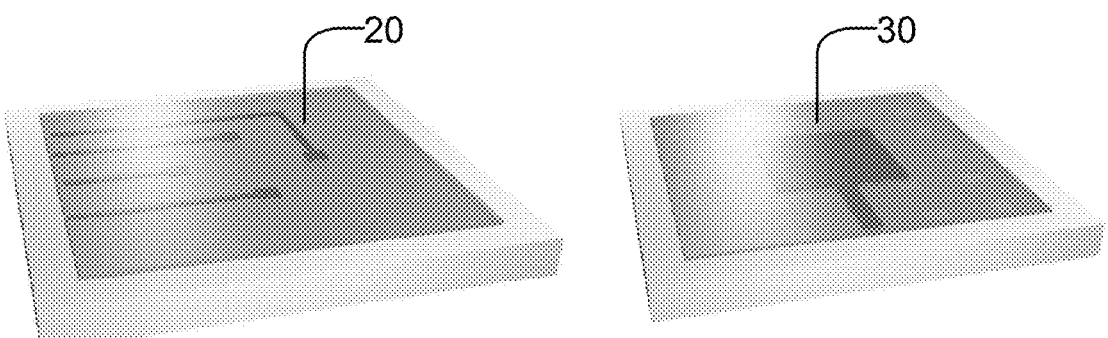
Figure 10D:
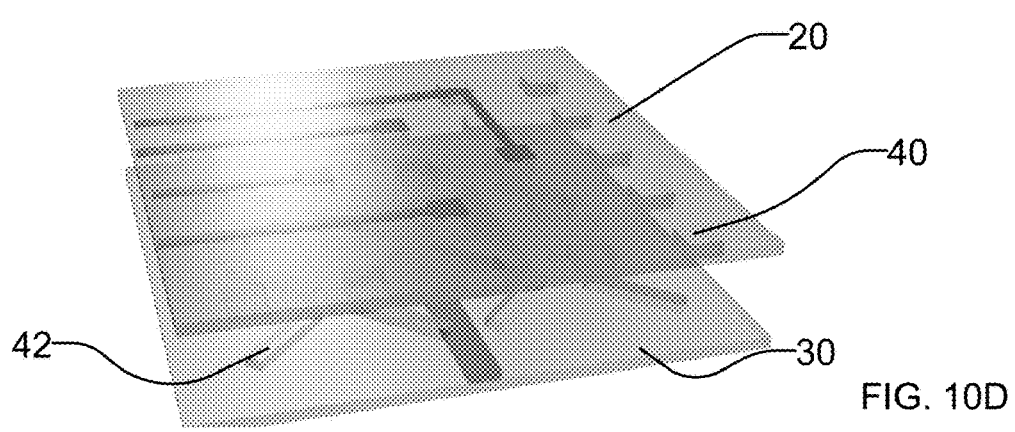

Bonded pillars 40 may generally be separated by distances greater than their maximum tangential dimensions (e.g. greater than their thickness in the X-Y plane). As shown in FIG. 3d, this may mean that bonded pillars 40 are spaced such that for any cross-section taken through a bonded pillar 40 in a tangential direction (e.g. in the X-Y plane), the distance 36 between any two bonded pillars 40 is greater than the maximum cross-sectional dimension 38 of a bonded pillar 40. In some embodiments there may be only one contiguous bonded pillar 40, such as is shown in FIGS. 7b and 7c. In some further embodiments, a single bonded pillar 40 could be contiguous across a repeating array of sensor units.

While the bonded pillars 40 and support pillars 42 in FIGS. 5, 6, 8 and 9 are shown as having square and cross-shaped cross-sections respectively and are shown being arranged in an alternating grid arrangement, this is not necessary. Other cross-sections and distributions of pillars 40, 42 may be used. Examples of some alternative shapes and distributions are shown in FIGS. 7a through 7c. In FIG. 7a, bonded pillars 40 have a circular cross-section. In FIG. 7b, a single, contiguous, annular cross-section bonded pillar 40 encircles a plurality of support pillars 42. In FIG. 7c, a plurality of spiral-like support pillars 42 are enclosed by a hollow rectangular bonded pillar 40. In some embodiments, the pillars 40, 42 may have tangential cross-sections that vary along the normal direction (e.g. Z-direction) dimensions of the pillars.

FIGS. 10A-10C and FIGS. 11A-11C show a method for fabricating the sensor unit 10 according to a particular embodiment. A three-step mold-pattern-bond ('MPB') process can be used to produce a unibody sensor. In the currently preferred embodiment, a silicone-based elastomer, Ecoflex™, is used for sheets 20, 30 and pillars 40, 42. Ecoflex™ which is a silicone rubber produced by Smooth-On, Inc. of Macungie, PA Other elastically deformable materials, e.g. other silicone-based elastomers and/or the like, could be used for fabrication of any of sheets 20, 30 and/or pillars 40, 42. In currently preferred embodiments, deformable electrodes 12, 14 are fabricated from carbon black mixed with Ecoflex™. Although the resistivity of the carbon black based stretchable conductor is large (0.07 $\Omega$-m), it is satisfactory for capacitive sensing. Other deformable conductive materials could be used to provide electrodes 12, 14.

In the MPB fabrication process shown in the embodiment of FIG. 10, Ecoflex™ is first cured in the upper and lower molds (FIG. 10A) to build the upper and lower sheets 20, 30 and pillars 40, 42 respectively. The electrode segments 12, 14 are then patterned with carbon black mixed with uncured Ecoflex™ using shadow masks made of transparencies (FIG. 10B). Once patterned, the electrodes 12, 14 may be covered with an encapsulating layer of Ecoflex™ (FIG.

10C). The upper segment is then bonded to the lower segment by applying a thin layer of uncured Ecoflex™ on the bottoms of the bonded pillars 40 only (10D). The sensor is highly stretchable (e.g. it can be stretched to 300%).

While a system of molds and curing is described in the present embodiment, other methods of fabricating a dielectric architecture are considered. In some embodiments it is conceived that parts of the dielectric architecture may be produced by 3D printing of segments. Additionally, while Ecoflex™ is described as the dielectric, other materials may similarly be used including any of a variety of elastomers, such as PDMS and polyurethane. The material used may be a soft elastomer, potentially with a Young's modulus between 0.1 and 10 MPa. In some applications, materials with a Young's modulus as high or potentially higher than 100 MPa may be desirable. For some embodiments, it is ideal that the elastomer be moldable or patternable. For the electrodes, some embodiments may include electrodes produced using any of a variety of conducting additives introduced to an elastomer. Examples of such additives include carbon power, carbon nanotubes, graphene, silver nanowires (AgNW), conducting polymers (e.g. poly(3,4-ethylenedioxythiophene)). In some applications the electrodes could be provided by liquid metals contained in channels in the deformable sheets. In some embodiments, any of sheets 20, 30, electrodes 12, 14 and/or pillars 40, 42 may be fabricated using several layers of material(s), each of which may (but need not necessarily) be separately fabricated.

Using the dielectric and electrode architectures and arrangements described herein, the capacitive sensor 10 may be used to detect pressure, proximity and shear. Each combination of active and ground capacitance ($C_a$ through $C_d$) may be scanned sequentially to provide a map of a sensor taxel. When a suitably conductive object, such as a finger or other human body part, approaches the capacitive sensor 10 (as shown in FIG. 2a), a fraction of the electric field may be diverted through the conductive object, reducing the capacitance between sensor electrodes 12 and base electrode 14. When pressure is applied, this moves sensor electrodes 12 closer to base electrode 14 (as shown in FIG. 2c), thereby increasing the capacitance between each sensor electrode 12 and base electrode 14. If a shear force is applied (i.e. a force tangential to the sheet 20 in which the sensor electrodes 12 are disposed), this will tend to increase the amount of overlap (in normal directions) with the base electrode 14 of one or more of the sensor electrodes 12 and decrease the amount of overlap (in normal directions) with the base electrode of one or more of the electrodes (as shown in FIG. 2b).

Figure 11A:
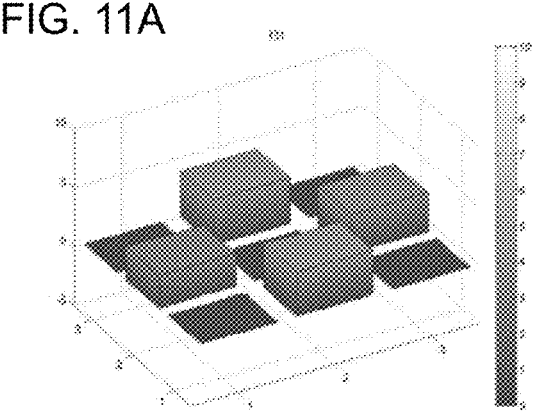
FIGS. 11A-11D depict maps (left-hand side) and photos (right-hand side) showing the capacitances observed by sensing electrodes of an embodiment of the invention when a finger is in proximity, lightly touching, applying pressure and applying shear respectively.
Figure 11A:
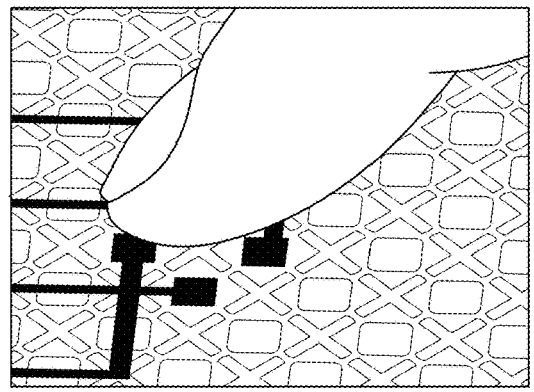
Figure 11B:
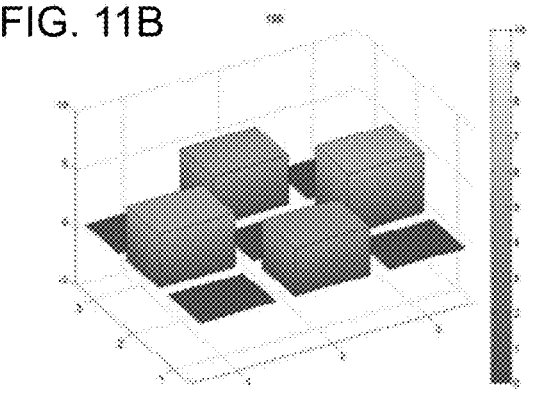
Figure 11B:
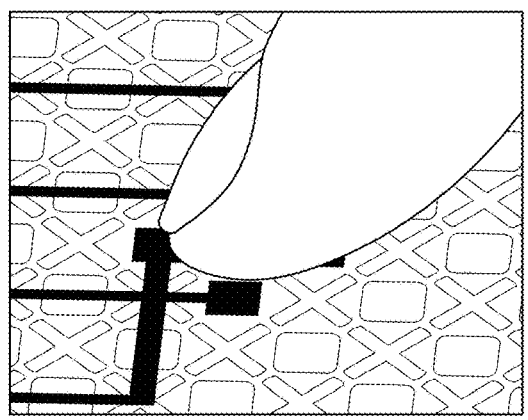
Figure 11C:
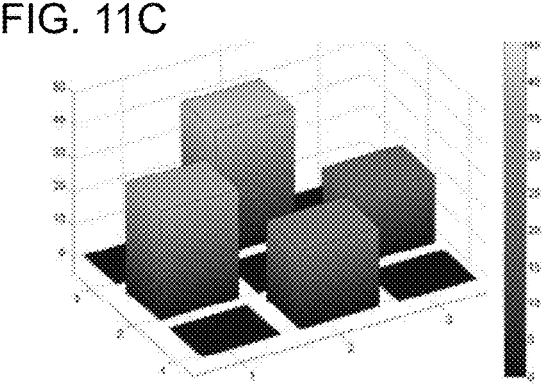
Figure 11C:
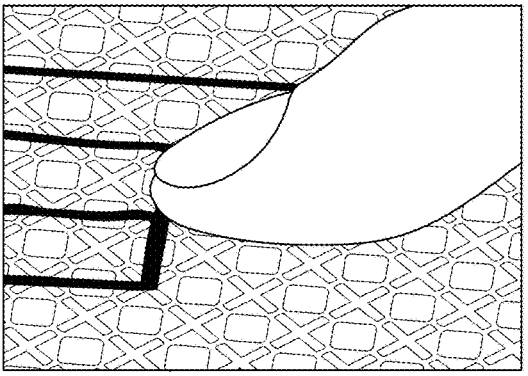
Figure 11D:
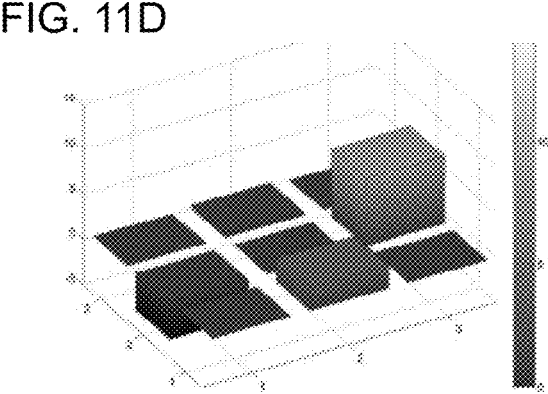
Figure 11D:
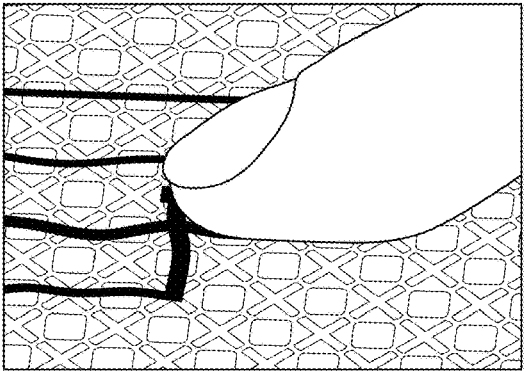

The interaction with the sensor unit can be interpreted based on the changes in the map as shown in FIGS. 11A-11D. The four bars on the left-hand side of each of FIG. 11A-11D indicates the change in value of each of $C_a$ through $C_d$ (relative to the corresponding capacitance in an absence of applied forces) for the scenario shown on the right-hand side. In particular, the bars on the left hand sides of FIGS. 11A and 11B show decreases in capacitance, the bars on the left hand side of FIG. 11C shows increases in capacitance, and the bars on the left hand side of FIG. 11D show an increase of some capacitances and a decrease in at least one capacitance, all relative to the corresponding capacitance in an absence of applied forces. The layout of the electrodes is such that there is a fraction of the electric field projected out of the plane of the sensor. With the approach of a human finger (FIG. 11A), the projected field from each of sensor electrodes 12 will couple increasingly with the finger and decreasingly with base electrode 14, and, consequently the coupling between the sensor electrodes 12 and base electrode 14 will decrease. This causes all four capacitances $C_a$ through $C_d$ to decrease (FIG. 11A). This decrease in capacitance may reach a minimum at the moment of contact, with the finger applying close to zero pressure, as shown in FIG. 11B. The bars on the left-hand side of FIG. 11B show a maximum decrease in capacitance relative to the corresponding capacitance in an absence of applied forces. When approached or touched by a piece of wood or plastic, the capacitance shows less change as compared to when approached by a human body part, such as a finger. This may be a useful feature for artificial skin in robotics applications, where the robot is expected to interact with humans in a delicate manner. Upon application of a pressure, the dielectric thickness is decreased as shown in FIG. 2C and all four capacitances increase as shown in FIG. 11C. The bars on the left-hand side of FIG. 11C show a substantial increase in capacitance relative to the corresponding capacitance in an absence of applied forces.

Figure 1A:
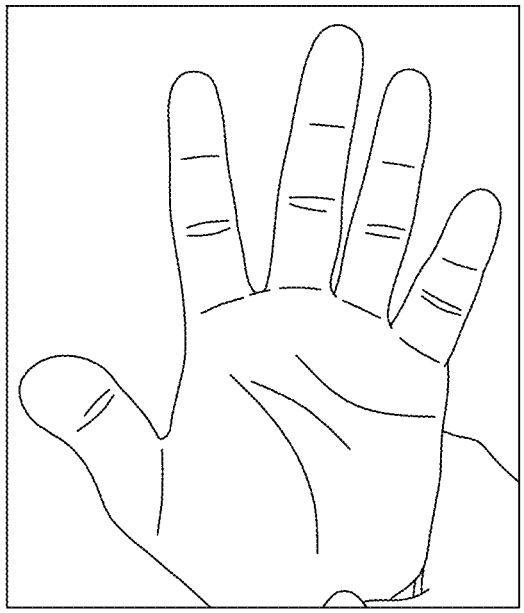
FIGS. 1a and 1b respectively depict a hand of a human and a hand of a robot incorporating a sensor according to a particular embodiment.
Figure 1B:
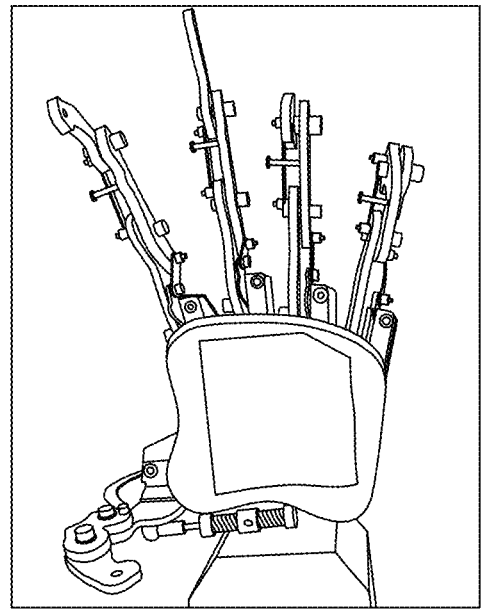
Figure 1C:
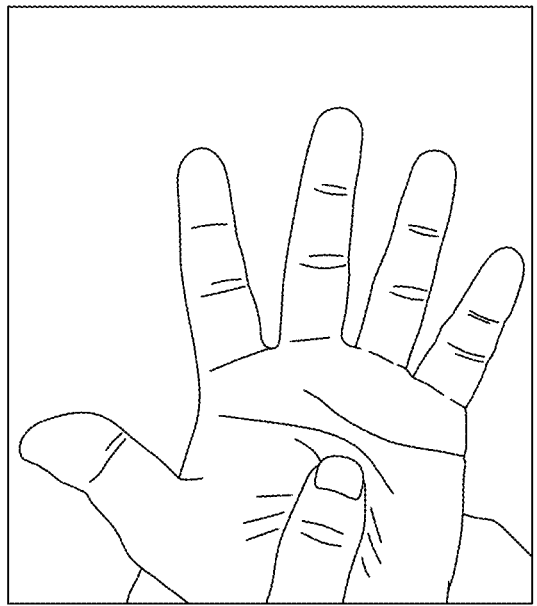
FIGS. 1c and 1d depict the hands of FIGS. 1a and 1b with the addition of a finger applying pressure and shear.
Figure 1D:
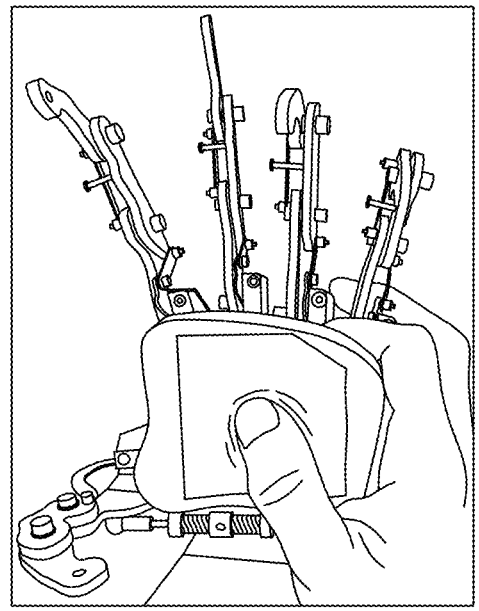

FIG. 11D shows the application of a shear and the response of the sensor unit to same. The applied shear buckles upper sheet 20 on the leading edge and stretches upper sheet 20 on the trailing edge of the shear as shown in FIG. 11D right-hand side. This means that upper sheet 20 moves in the tangential direction of the applied shear force (relative to lower sheet 30) and sensor electrodes 12 move similarly in the tangential direction relative to base electrode 14. The dielectric architecture of pillars 40, 42 enables this movement of sheet 20 and sensor electrodes 12 relative to sheet 30 and base electrode 14. This movement mimics the response of real human skin as shown in FIG. 1c. The capacitance response is shown on the left-hand side of FIG. 11D. It is observed that the capacitor $C_a$ at the trailing edge of the shear increases due to the increase in overlap area as illustrated in FIG. 2b. A fraction of this increase is due to the downward deformation at this location due to pressure applied in the process of applying the shear. The capacitance $C_d$ at the leading edge of the sensor decreases slightly. The two capacitors perpendicular to the axis of the shear force may increase slightly due to a downward deformation component of the applied finger shear in a similar manner as to $C_a$.

In this way the combined information of the four capacitances provide a detailed account of the stimulus.

Each sensor electrode 12 may be connected to a controller (not shown) via a suitable sensing circuit (not shown), so that each sensor electrode 12 may send a sensor signal providing the capacitance observed by that sensor electrode 12 (relative to base electrode 14, which may be held at ground). The controller may then interpret these signals according to the principles above or the rudimentary algorithm provided further below to determine whether an object is in proximity, whether a pressure (normally oriented force) has been applied and whether a shear (tangentially oriented) force has been applied. In some embodiments, the controller will receive signals from a plurality of capacitive sensing units arranged in an array and may be able to further interpret the results to determine information that might not be made available by a single capacitive sensing unit. For example, where each capacitive sensing unit comprises only a single sensor electrode partially overlapping (or almost overlapping) in a normal direction, a base electrode and the capacitive sensing units are arranged in an array in which various units are arranged at a different angle to others of the units (as shown in FIG. 4b), then an increase across all of the sensing units may be indicative of pressure, whereas an increase among some sensor units arranged in one direction and a decrease among others arranged in a different direction may be indicative of shear.

Figure 5:
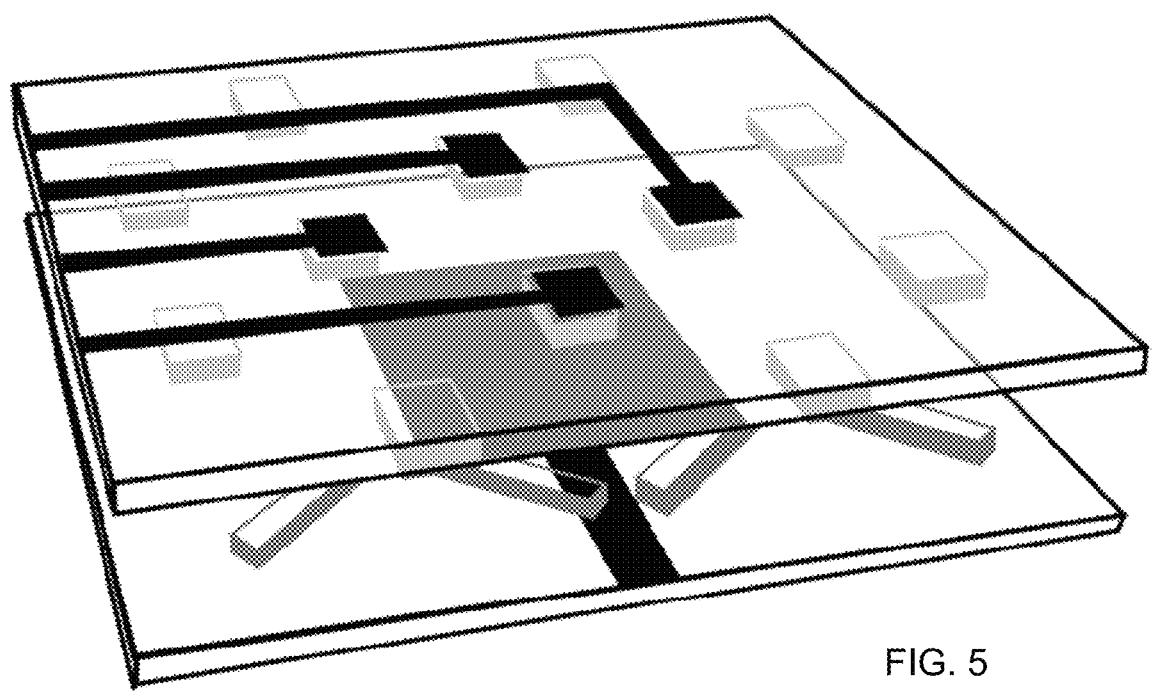
FIG. 5 depicts a perspective view of two layers of a capacitive sensing unit according to an embodiment of the invention.
Figure 6:
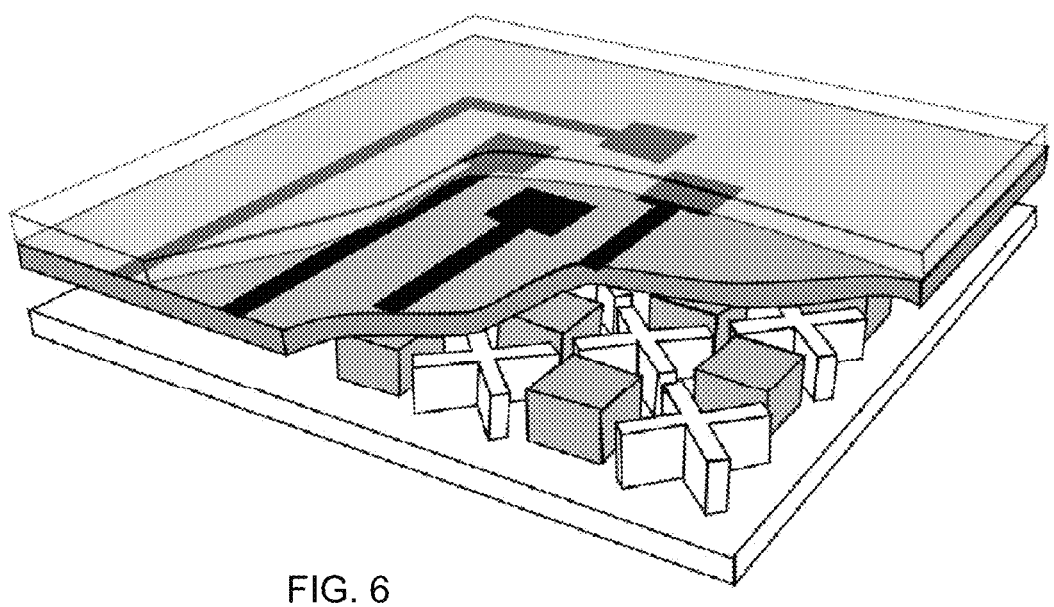
FIG. 6 depicts a cut-away perspective view of a capacitive sensing unit according to another embodiment of the invention.
Figure 12:
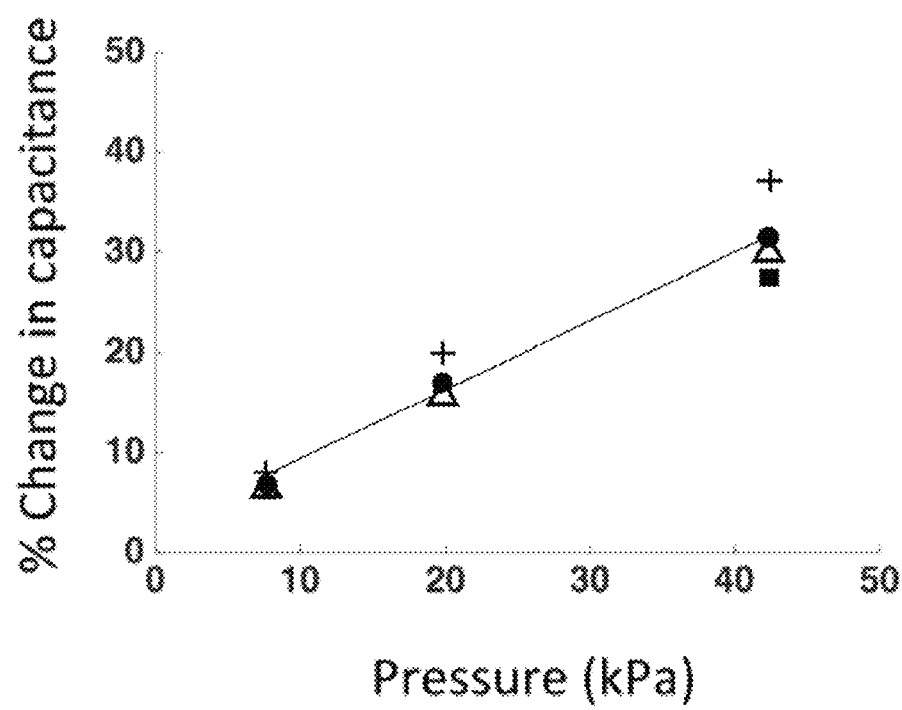
FIG. 12 is a chart showing the relative change in capacitances observed for a given applied pressure in an experimental application of an embodiment of the invention.
Figure 13:
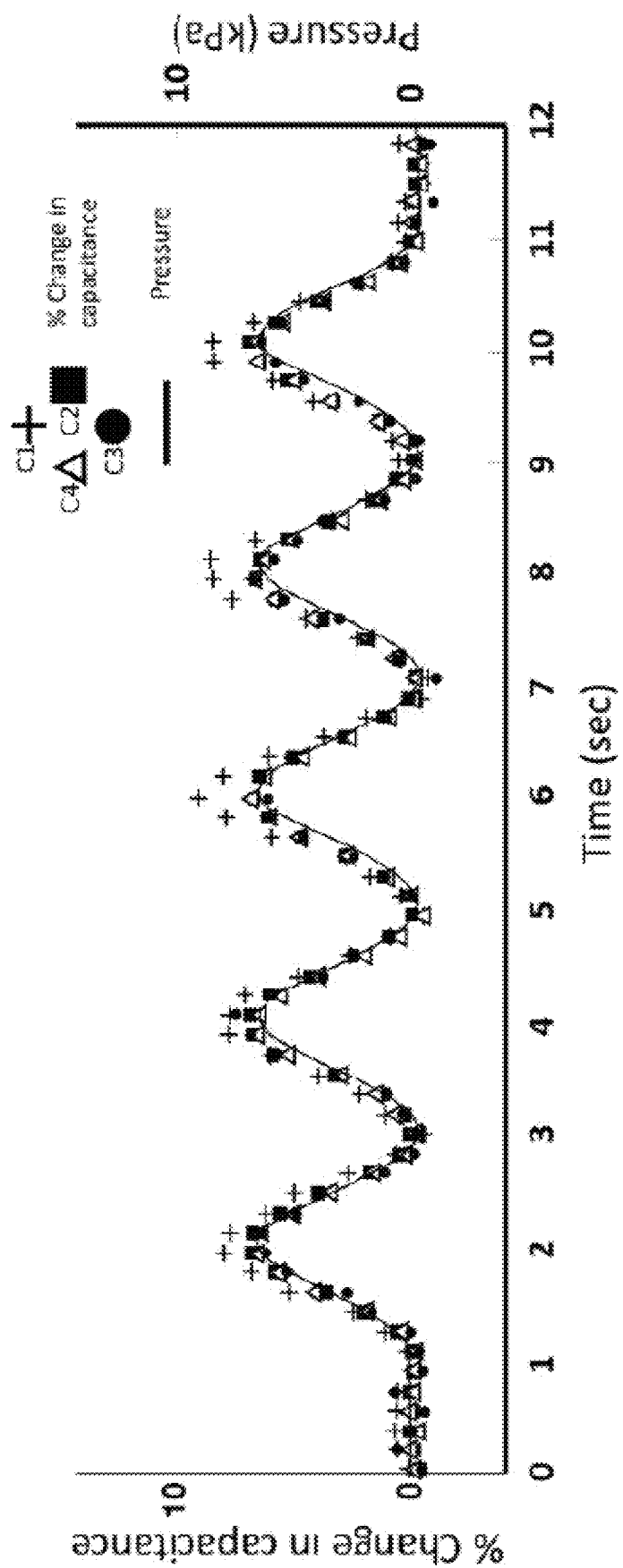
FIG. 13 is a chart showing the relative change in capacitances observed for a pressure varying sinusoidally with time in an experimental application of an embodiment of the invention.
Figure 15:
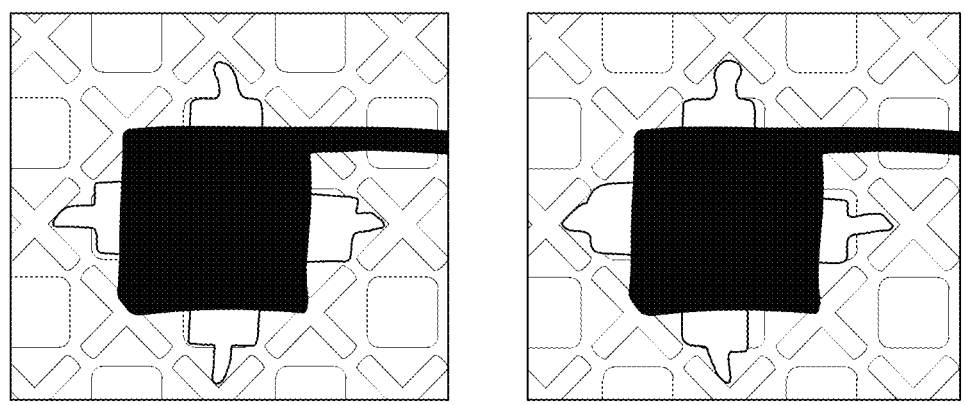
FIG. 15 provides two photos of an experimental setup of an embodiment of the invention showing a top view of base electrode and sensing electrodes in a resting state (left) and after the application of a shear force (right).

During testing to investigate the pressure sensitivity, the sensor of the embodiment shown in FIGS. 5, 6 and 15 was mounted on a load cell and a 3D printed finger with a square cross-section of 12 mm by 12 mm was used to apply force to the sensor. A dynamic mechanical analyzer was used to obtain the displacement and pressure data. A plot of the change in capacitance (ΔC/Co) in percentage versus pressure (normal direction force) applied is shown in FIG. 12. It is observed that all four capacitances increase approximately linearly with the application of a normal direction force (pressure). FIG. 12 shows sensitivity to pressures as low as 10 kPa and a linear sensitivity of 10% change per kPa. FIG. 13 shows the result of the application of a sinusoidal normally oriented force; the capacitors each show similar sinusoidal change up to about 6% change in capacitance with the application of normally oriented pressures in the range of up to 6 kPa.

Figure 14:
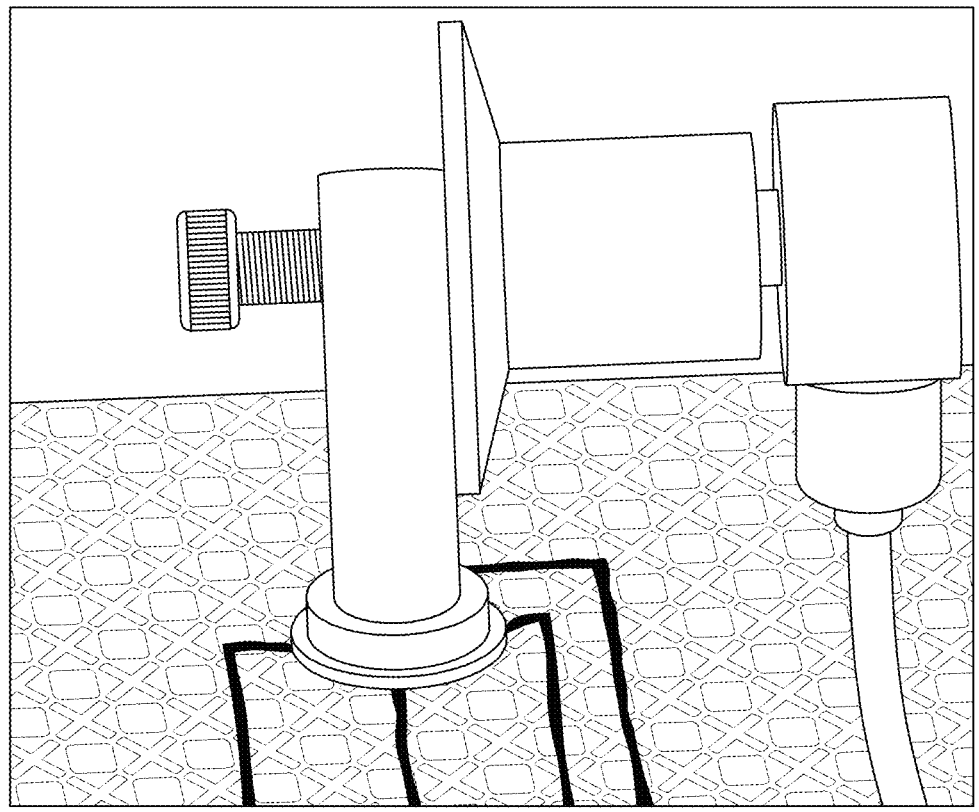
FIG. 14 is a photo of an experimental setup of an embodiment of the invention designed to test the application of a shear force.
Figure 16:
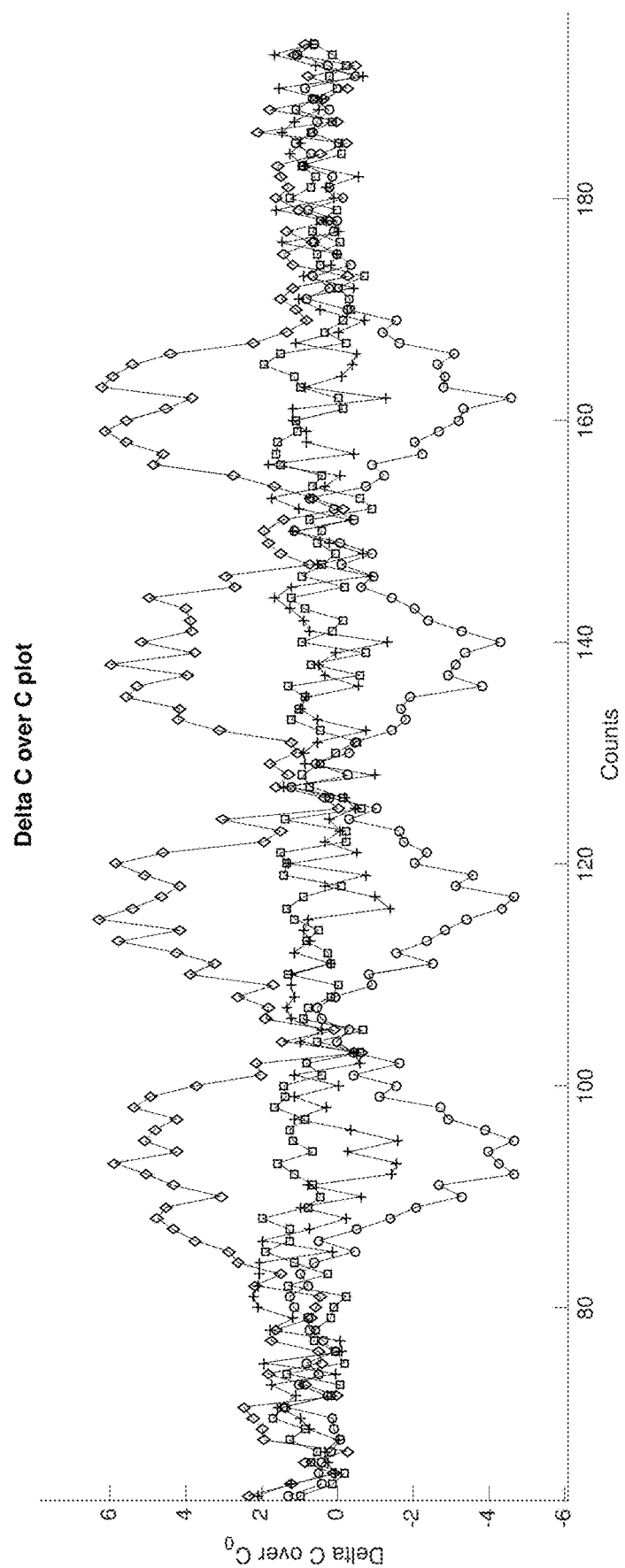
FIG. 16 is a chart showing the relative change in capacitance observed for a shear force varying sinusoidally with time in an experimental application of an embodiment of the invention.
Figure 17A:
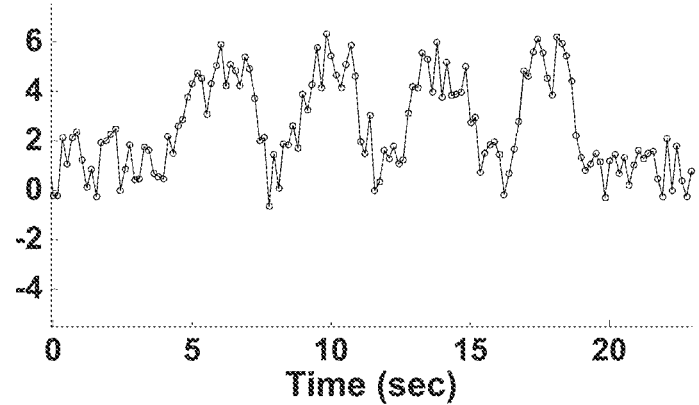
FIGS. 17a-17d are charts showing separately the relative change in capacitance of each of the sensing electrodes according to the experimental results shown in FIG. 16.
Figure 17B:
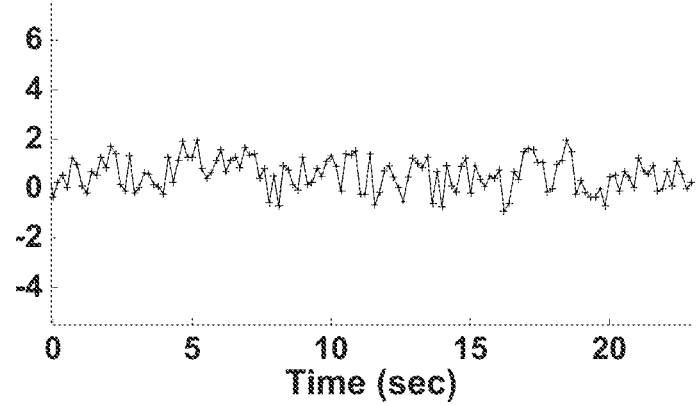
Figure 17C:
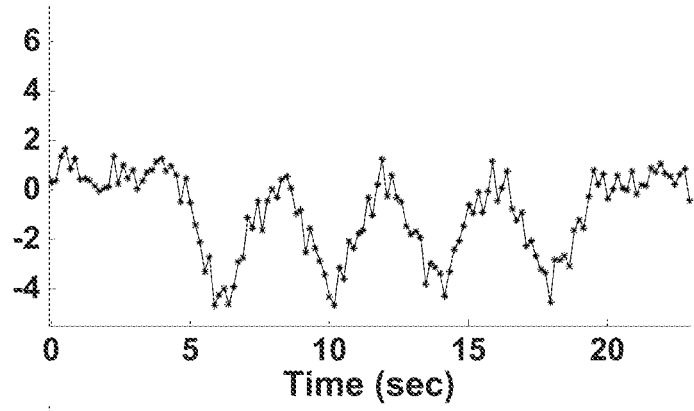
Figure 17D:
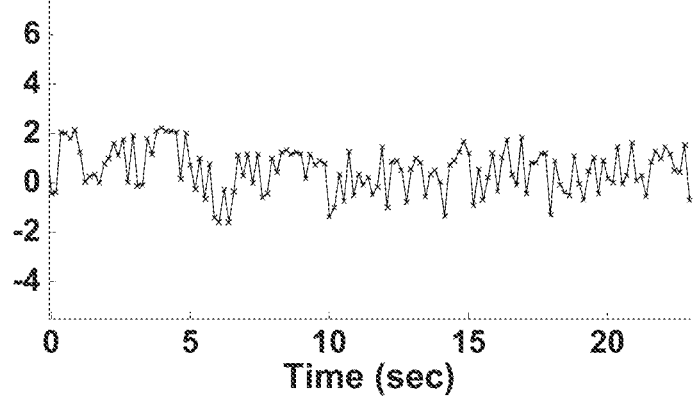

In order to apply a tangential (shear) force, a 3D printed finger was again used. The finger was connected to a load cell and was used to displace the surface of the sensor in the horizontal direction as shown in the experimental setup in FIG. 14. The finger was used to press on the surface of the sensor (in the normal direction) initially before starting the experiment to ensure proper adhesion and reduce slipping of the sensor during the application of the tangentially oriented shear force. Images of the bottom of the sensor for the steady state (left hand side) and sheared state (right hand side) are shown in FIG. 15. A plot showing the change in capacitance of all $C_a$ through $C_d$ with a sinusoidal shear force applied is shown in FIG. 16. FIGS. 17a-17d show the capacitance changes for each of $C_a$ through $C_d$ separated out, each to their own chart. It is observed that $C_a$ (FIG. 17a) at the trailing edge of the shear increases by roughly 5% and $C_c$ (FIG. 17c) at the leading edge of the shear decreases by approximately the same amount during the application of shear force. $C_b$ and $C_d$ remain fairly constant. This cumulative information can be used to interpret the stimulus as a shear along with the direction. Without any signal processing or machine learning and only monitoring the different levels of the capacitance, a rudimentary algorithm may recognize the applied stimuli.

Figure 18:
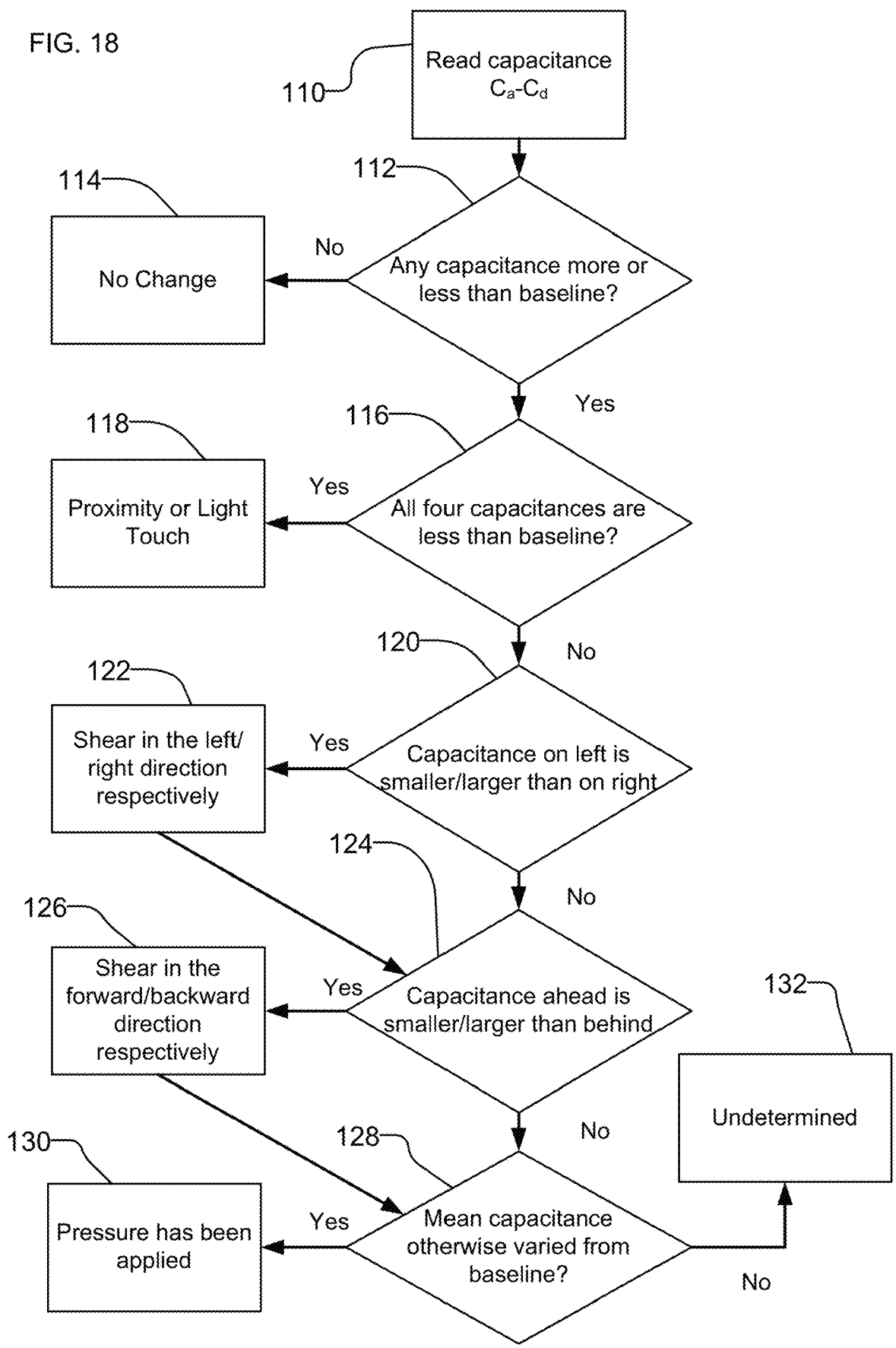
FIG. 18 depicts a method of determining whether an object is in proximity or lightly touching, applying shear, or applying force according to an embodiment of the invention.

A flowchart showing a high-level and rudimentary model of this algorithm is shown in FIG. 18. The FIG. 18 method may be performed by a suitably configured processor. Step 110 involves checking the capacitances $C_a$ through $C_d$. Step 112 involves checking whether any of the capacitance is more or less than baseline. If step 112 concludes no, then the algorithm moves on to step 114 and interprets that there has been no change. If step 112 concludes yes, then the algorithm proceeds to step 116 which involves checking whether all four capacitances are less than baseline. If step 116 concludes yes, then the method proceeds to step 118 and determines that there is an object in proximity to or lightly touching the sensor unit 10. If step 116 concludes no, then the method proceeds to step 120, where it checks the capacitances of a first opposing (e.g. left/right) pair of electrodes have diverged, e.g. whether the change in capacitance of one electrode increases and the change in an opposing electrode decreases. If step 120 concludes yes, then the method proceeds to step 122 determining that a tangentially oriented (shear) force has been applied to the sensor unit 10 in the left or right direction respectively and then proceeds to step 124. If step 120 concludes no, then the method proceeds to step 124. In step 124, the method involves checking whether the capacitances of the second opposing (e.g. front/back) pair of electrode have diverged, e.g. whether the change in capacitance of one electrode increases and the change in an opposing electrode decreases. If step 124 concludes yes, then the method proceeds to step 126 having determined that a tangentially oriented (shear) force has been applied in the forward or back direction respectively, and then proceeds to step 128. If step 124 concludes no, the algorithm proceeds to step 128. In step 128, the algorithm involves checking whether the mean capacitance has changed from the baseline mean capacitance. If step 128 concludes yes, then the method proceeds to step 130 and determines that normally oriented force (pressure) has been applied. If no, then the method proceeds to step 132 returning an undetermined result. Consequently, the algorithm can determine that shear has been applied in one or more directions and that pressure has been applied.

In embodiments in which there are more of fewer than four sensor electrodes, or in which the electrodes are differently arranged, there may be corresponding changes to the method of FIG. 18. In embodiments in which each capacitive sensing unit 10 has only on sensor electrode 12 and one base electrode 14, multiple capacitive sensing units 10 can be arranged so that a tangentially oriented (shear) force would cause the capacitance of different capacitive sensing units to differentially change based on the direction of the shear, so that by comparison between sensing units (as compared to comparison between sensor electrodes within the same capacitive sensing unit) can determine the scale and direction of the shear force The sensor is seamless and smooth in appearance and can be made visually similar to human skin. In some embodiments the sensor may appear visually identical to human skin. Proximity and light contact with a human and/or a material with similar electrical properties leads to a decrease in capacitance of all four capacitors with the minimum being at the point of contact with the application of zero pressure. Inanimate objects like wood or plastic have little to no effect, since the dielectric constant is approximately 10 times less than that of humans and therefore the increase in coupling of the sensor electric fields with the non-human test object is much less in comparison to a human. This may be a desirable feature for humanoid robots to have such that they can be programmed to handle the interaction with a delicate touch and have safety limits installed.

The sensor offers high pressure-sensitivity (as low as a few kPa). Applying a small pressure increases the capacitance much beyond the steady state value, so that it is possible to discriminate a reduction in applied pressure from a complete retraction of a human body part.

Sensors according to these embodiments may offer the ability to buckle and stretch locally like a skin and enable detection of a surface (tangentially oriented) shear force. In addition to detecting magnitude, sensors according to these embodiments can also provide information regarding the direction. The design of the electrodes is such that if a stimulus is a mix of tangentially oriented shear force and normally oriented pressure force in some regions, the sensors can still be used to decipher that information, as discussed elsewhere herein. A tangentially oriented (shear) force will lead to the trailing edge capacitance to increase substantially and the leading edge to decrease. The two remaining capacitances will either increase slightly due to any pressure (normally oriented force) associated with an applied shear or remain fairly unchanged. This response is easily differentiable from a normally oriented force (pressure) applied where all four capacitances increase uniformly.

Experimentally, the readout electronics were based on well-established capacitive sensor readout circuits that are widely used in mobile devices. An Arduino platform together with a capacitance-to-digital converter (CDC) chip was used in the experiments. In application, a variety of consumer electronics or electronics may be suitable. A custom single-chip solution can be envisioned that has approximately double the 5-mm×6-mm footprint of the CDC and has an average power consumption of less than 1 mW. At this power level and with 8 hours of continuous operation per day, the proposed system might be expected to last 3 months without recharging using a typical smartwatch battery.

The molding process described above is conventionally used in numerous fields and the electrode patterning process is analogous to screen-printing processes. To cover a large area (e.g. the entire surface of a robot or an entire prosthetic arm), a limit to maximum dimensions may be set by the RC time constant. The conductivity may be similar to that of hydrogel. For an array of 16×16 capacitors it may be possible to refresh a 50 m×50 m large sensor array every half a second.

An attractive feature of any capacitive technology is that its resolution scales in proportion to the dimensions of the electrodes. Like a parallel plate capacitor whose dimensions are uniformly scaled up or down, the magnitude of the projected capacitance also scales linearly as do the vertical and lateral resolutions. Devices can be constructed to sense at a much larger or smaller scales than the millimeter levels demonstrated here.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a computer system for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Embodiments of the invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g. EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary aspects and embodiments have been discussed above, those of skill in the art will recognize certain modifications, permutations, additions and sub-combinations thereof. For example:

The description herein makes use of directional terms, such as "upper" and "lower" to describe various sensor embodiments. Such directional terms are used for ease of explanation only, since the drawings show sensors having particular orientations. Sensors are not limited to the orientations shown in the drawings and, similarly, the words "upper", "lower" and similar directional terms should not be understood in a restrictive context. In some embodiments, the word "upper" may be considered to be similar to "outer" or otherwise relatively close to an environment to be sensed and the word "lower" may be considered to be similar to "inner" or otherwise relatively distal from an environment to be sensed.

It is therefore intended that the following appended claims and claims hereafter introduced are interpreted to include all such modifications, permutations, additions and sub-combinations as are consistent with the broadest interpretation of the specification as a whole.

What is claimed is:

1. A sensor unit for detecting shear force applied to the sensor in a tangential direction that is generally tangential to an active surface of the sensor at a location where the shear force is applied, the sensor unit comprising:
   a first deformable sheet comprising the active surface on one side of the first deformable sheet and a first inner surface on an opposing side of the first deformable sheet;
   a second deformable sheet comprising a second inner surface on one side of the second deformable sheet;
   wherein the first inner surface has a first inner surface normal vector oriented toward the second inner surface and is spaced apart from the second inner surface in a direction along the first inner surface normal vector;
   wherein one of the first and second deformable sheets supports one or more electrically conductive sensor electrodes and the other one of the first and second deformable sheets supports an electrically conductive base electrode;
   a plurality of bonded dielectric pillars, each bonded dielectric pillar extending between the first inner surface and the second inner surface and bonded to the first inner surface at a first one of bonded dielectric pillar ends and to the second inner surface at an opposing second one of bonded dielectric pillar ends;
   wherein the plurality of bonded dielectric pillars are spaced apart from one another in one or more directions tangential to the first inner surface; and
   one or more support dielectric pillars, each support dielectric pillar bonded to one of the first inner surface and the second inner surface at a bonded end of the support dielectric pillar and having a non-bonded end that is capable of translation relative to the other one of the first inner surface and the second inner surface;
   wherein the one or more support dielectric pillars are spaced apart from each of the plurality of bonded dielectric pillars in one or more directions tangential to the first inner surface to thereby maintain a space between the first and second deformable sheets.

2. A sensor unit according to claim 1 wherein, for each of the one or more support dielectric pillars, in the absence of applied force, the non-bonded end is in abutting contact with the other one of the first inner surface and the second inner surface.

3. A sensor unit according to claim 1 wherein, for each of the one or more support dielectric pillars, in the absence of applied force, the non-bonded end is spaced apart from the other one of the first inner surface and the second inner surface.

4. A sensor unit according to claim 1 wherein, in the absence of shear force applied to the sensor, a fraction less than one of an inner surface surface area of each of the one or more sensor electrodes overlaps an inner surface surface area of the base electrode in the direction along the first inner surface normal vector.

5. A sensor unit according to claim 1 wherein the one or more sensor electrodes comprises a plurality of sensor electrodes spaced apart from one another in one or more directions tangential to the first inner surface and wherein a fraction greater than 50% of an inner surface surface area of each of the plurality of sensor electrodes overlaps with a corresponding one of the plurality of bonded dielectric pillars in a direction aligned with first inner surface normal vector.

6. A sensor unit according to claim 1 wherein, in response to shear force oriented in a direction tangential to the active surface, the first sheet deforms and, as a result of this deformation, at least one of the one or more sensor electrodes moves in the tangential direction relative to the base electrode; and
   wherein, for such movement of the at least one of the one or more sensor electrodes, a first capacitance between the at least one of the one or more sensor electrodes and the base electrode either: increases relative to a capacitance between the at least one of the one or more sensor electrodes and the base electrode in an absence of the shear force; or decreases relative to the capacitance between the at least one of the one or more sensor electrodes and the base electrode in the absence of the shear force.

7. A sensor unit according to claim 1 wherein the one or more sensor electrodes comprise a first sensor electrode and a second sensor electrode which are spaced apart from one another in a direction tangential to the active surface and wherein, in response to shear force oriented to have a component in the tangential direction:
   the first sheet moves in the tangential direction relative to the second sheet or deforms and, as a result of this movement or deformation, the first and second sensor electrodes move in the tangential direction relative to the base electrode; and
   wherein, for such movement of the first and second sensor electrodes, a first capacitance between the first sensor electrode and the base electrode increases relative to a capacitance between the first electrode sensor and the base electrode in an absence of the shear force and a second capacitance between the second sensor electrode and the base electrode decreases relative to a capacitance between the second electrode sensor and the base electrode in the absence of the shear force.

8. A sensor unit according to claim 7 wherein, for such movement of the first and second sensor electrodes, an overlap area of an inner surface of the first sensor electrode that overlaps an inner surface of the base electrode in the direction oriented along the first inner surface normal vector increases relative to the overlap area of the inner surface of the first sensor electrode that overlaps the inner surface of the base electrode in the absence of the shear force and an overlap area of an inner surface of the second sensor electrode that overlaps the inner surface of the base electrode in the direction oriented along the first inner surface normal vector decreases relative to the overlap area of the inner surface of the second sensor electrode that overlaps the inner surface of the base electrode in the absence of the shear force.

9. A sensor unit according to claim 7 wherein, in response to normal force oriented to have a component in the direction along the first inner surface normal vector:
the first sheet moves in the direction along the first inner surface normal vector relative to the second sheet and the first and second sensor electrodes move in the direction along the first inner surface normal vector relative to the base electrode; and
wherein, for such movement of the first and second sensor electrodes, the first capacitance between the first sensor electrode and the base electrode increases relative to a capacitance between the first sensor electrode and the base electrode in an absence of the normal force and the second capacitance between the second sensor electrode and the base electrode increases relative to a capacitance between the second sensor electrode and the base electrode in the absence of the normal force.

10. A sensor unit according to claim 7 wherein, in response to a presence of a portion of a human body in proximity to the sensing surface:
the first capacitance between the first sensor electrode and the base electrode decreases relative to a capacitance between the first sensor electrode and the base electrode in an absence of the presence of the portion of the human body in proximity to the sensing surface and the second capacitance between the second sensor electrode and the base electrode decreases relative to a capacitance between the second sensor electrode and the base electrode in the absence of the presence of the portion of the human body in proximity to the sensing surface.

11. A sensor unit for detecting shear force applied to the sensor in a tangential direction that is generally tangential to an active surface of the sensor at a location where the shear force is applied, the sensor unit comprising:
a first deformable sheet comprising the active surface on one side of the first deformable sheet and a first inner surface on an opposing side of the first deformable sheet;
a second deformable sheet comprising a second inner surface on one side of the second deformable sheet and an outer surface on an opposing side of the second deformable sheet;
wherein the first inner surface has a first inner surface normal vector oriented toward the second inner surface and is spaced apart from the second inner surface in a direction along the first inner surface normal vector;
wherein one of the first and second deformable sheets supports one or more electrically conductive sensor electrodes and the other one of the first and second deformable sheets supports an electrically conductive base electrode;
a deformable dielectric layer located in at least some of a volume between the first inner surface and the second inner surface;
one or more support dielectric pillars located within the deformable dielectric layer, each support dielectric pillar bonded to one of the first inner surface and the second inner surface at a bonded end of the support dielectric pillar and having a non-bonded end that is capable of translation relative to the other one of the first inner surface and the second inner surface;
wherein the one or more support dielectric pillars are spaced apart from each of the plurality of bonded dielectric pillars in one or more directions tangential to the first inner surface to thereby maintain a space between the first and second deformable sheets;
wherein, in response to shear force oriented in a direction tangential to the active surface, the first sheet deforms and, as a result of this deformation, at least one of the one or more sensor electrodes moves in the tangential direction relative to the base electrode; and
wherein, for such movement of the at least one of the one or more sensor electrodes, a first capacitance between the at least one of the one or more sensor electrodes and the base electrode either: increases relative to a capacitance between the at least one of the one or more sensor electrodes and the base electrode in an absence of the shear force; or decreases relative to the capacitance between the at least one of the one or more sensor electrodes and the base electrode in the absence of the shear force.

12. A sensor unit according to claim 11 wherein the one or more sensor electrodes comprise a first sensor electrode and a second sensor electrode which are spaced apart from one another in a direction tangential to the active surface and wherein, in response to shear force oriented to have a component in the tangential direction:
the first sheet moves in the tangential direction relative to the second sheet or deforms and, as a result of this movement or deformation, the first and second sensor electrodes move in the tangential direction relative to the base electrode; and
wherein, for such movement of the first and second sensor electrodes, a first capacitance between the first sensor electrode and the base electrode increases relative to a capacitance between the first sensor electrode and the base electrode in an absence of the shear force and a second capacitance between the second sensor electrode and the base electrode decreases relative to a capacitance between the second sensor electrode and the base electrode in the absence of the shear force.

13. A sensor unit according to claim 12 wherein, for such movement of the first and second sensor electrodes:
an overlap area of an inner surface of the first sensor electrode that overlaps an inner surface of the base electrode in the direction oriented along the first inner surface normal vector increases relative to the overlap area of the inner surface of the first sensor electrode that overlaps the inner surface of the base electrode in the absence of the shear force; and
an overlap area of an inner surface of the second sensor electrode that overlaps the inner surface of the base electrode in the direction oriented along the first inner surface normal vector decreases relative to the overlap area of the inner surface of the second sensor electrode that overlaps the inner surface of the base electrode in the absence of the shear force.

14. A sensor unit according to claim 12 wherein, for such movement of the first and second sensor electrodes:
an inner surface of the first sensor electrode moves closer to a location where the inner surface of the first electrode would overlap an inner surface of the base electrode in the direction oriented along the first inner surface normal vector relative to the location where the inner surface of the first electrode would overlap the inner surface of the base electrode in the absence of the shear force; and an overlap area of an inner surface of the second sensor electrode that overlaps the inner surface of the base electrode in the direction oriented along the first inner surface normal vector decreases relative to the overlap area of the inner surface of the second sensor electrode that overlaps the inner surface of the base electrode in the absence of the shear force.

15. A sensor unit according to claim 11 wherein, in response to normal force oriented to have a component in the direction along the first inner surface normal vector:
the first sheet moves in the direction parallel to the first inner surface normal vector relative to the second sheet and the first and second sensor electrodes move in the direction parallel to the first inner surface normal vector relative to the base electrode; and
wherein, for such movement of the first and second sensor electrodes, the first capacitance between the first sensor electrode and the base electrode increases relative to a capacitance between the first sensor electrode and the base electrode in an absence of the normal force and the second capacitance between the second sensor electrode and the base electrode increases relative to a capacitance between the second sensor electrode and the base electrode in the absence of the normal force.

16. A method for detecting shear force applied to a sensor in a direction that is generally tangential to an active surface of the sensor at a location where the shear force is applied, the method comprising:
providing a shear sensor comprising:
a first sheet comprising the active surface on one side of the first sheet and a first inner surface on an opposing side of the first sheet;
a second sheet comprising a second inner surface on one side of the second sheet;
wherein the first inner surface has a first inner surface normal vector oriented toward the second inner surface and is spaced apart from the second inner surface in a direction along the first inner surface normal vector;
wherein one of the first and second sheets supports one or more electrically conductive sensor electrodes and the other one of the first and second sheets supports an electrically conductive base electrode; and
a deformable dielectric layer located in at least some of a volume between the first inner surface and the second inner surface;
one or more support dielectric pillars located within the deformable dielectric layer, each support dielectric pillar bonded to one of the first inner surface and the second inner surface at a bonded end of the support dielectric pillar and having a non-bonded end that is capable of translation relative to the other one of the first inner surface and the second inner surface;
wherein the one or more support dielectric pillars are spaced apart from each of the plurality of bonded dielectric pillars in one or more directions tangential to the first inner surface to thereby maintain a space between the first and second sheets;
in response to shear force oriented in a direction tangential to the active surface:
permitting deformation of the first sheet and, as a result of such deformation, corresponding movement of at least one of the one or more sensor electrodes in the tangential direction relative to the base electrode; and in response to the relative movement in the tangential direction between the at least one of the one or more sensor electrodes and the base electrode:
detecting at least one of: an increase and a decrease in a first capacitance between the at least one of the one or more sensor electrodes and the base electrode relative to a capacitance between the at least one of the one or more sensor electrodes and the base electrode in an absence of the shear force.

17. A method according to claim 16:
wherein the one or more sensor electrodes comprise a first sensor electrode and a second sensor electrode which are spaced apart from one another in a direction tangential to the active surface; and
wherein, in response to shear force oriented to have a component in the tangential direction, the method comprises:
permitting movement of the first sheet in the tangential direction relative to the second sheet or deformation of the first sheet and, as a result of this movement or deformation, corresponding movement of the first and second sensor electrodes in the tangential direction relative to the base electrode; and
in response to the relative movement in the tangential direction between the first and second sensor electrodes and the base electrode:
detecting an increase in a first capacitance between the first sensor electrode and the base electrode relative to a capacitance between the first sensor electrode and the base electrode in an absence of the shear force;
detecting a decrease in a second capacitance between the second sensor electrode and the base electrode relative to a capacitance between the second sensor electrode and the base electrode in the absence of the shear force.

18. A method according to claim 17 wherein:
detecting the increase in the first capacitance relative to the capacitance between the first sensor electrode and the base electrode in the absence of the shear force corresponds to an increase in an overlap area of an inner surface of the first sensor electrode that overlaps an inner surface of the base electrode in the direction oriented along the first inner surface normal vector relative to the overlap area of the inner surface of the first sensor electrode that overlaps the inner surface of the base electrode in the absence of the shear force;
detecting the decrease in the second capacitance relative to the capacitance between the second sensor electrode and the base electrode in the absence of the shear force corresponds to a decrease in an overlap area of an inner surface of the second sensor electrode that overlaps the inner surface of the base electrode in the direction oriented along the first inner surface normal vector relative to the overlap area of the inner surface of the second sensor electrode that overlaps the inner surface of the base electrode in the absence of the shear force.

19. A method according to claim 17 wherein, in response to normal force oriented to have a component in the direction along the first inner surface normal vector:
permitting movement of the first sheet in the direction along the first inner surface normal vector relative to the second sheet and corresponding movement of the first and second sensor electrodes in the direction along the first inner surface normal vector relative to the base electrode; and wherein, for such movement of the first and second sensor electrodes:

detecting that the first capacitance between the first sensor electrode and the base electrode increases relative to a capacitance between the first sensor electrode and the base electrode in an absence of the normal force; and detecting that the second capacitance between the second sensor electrode and the base electrode increases relative to a capacitance between the second sensor electrode and the base electrode in the absence of the normal force.

\* \* \* \* \*